(12) United States Patent
Discenzo

(10) Patent No.: US 6,948,381 B1
(45) Date of Patent: Sep. 27, 2005

(54) SYSTEM AND METHOD FOR SENSING TORQUE ON A ROTATING SHAFT

(75) Inventor: Frederick M. Discenzo, Brecksville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/409,894

(22) Filed: Apr. 9, 2003

Related U.S. Application Data

(60) Provisional application No. 60/371,104, filed on Apr. 9, 2002.

(51) Int. Cl.$^7$ ............................. G01L 3/02; G01L 1/24
(52) U.S. Cl. ................................. 73/862.324; 73/800
(58) Field of Search ................... 73/862.324, 862.624, 73/800

(56) References Cited

U.S. PATENT DOCUMENTS

| | | | | |
|---|---|---|---|---|
| 4,263,810 A | * | 4/1981 | Chiu | 73/800 |
| 4,342,907 A | * | 8/1982 | Macedo et al. | 73/705 |
| 4,648,274 A | * | 3/1987 | Trainer | 73/800 |
| 4,962,669 A | * | 10/1990 | Gernhart et al. | 73/800 |
| 5,001,937 A | * | 3/1991 | Bechtel et al. | 73/862.324 |
| 5,490,430 A | * | 2/1996 | Anderson et al. | 73/862.324 |
| 5,723,794 A | * | 3/1998 | Discenzo | 73/800 |
| 5,747,699 A | * | 5/1998 | Ebi | 73/800 |
| 6,219,139 B1 | * | 4/2001 | Lesniak | 73/800 |
| 6,434,512 B1 | * | 8/2002 | Discenzo | 702/184 |
| 6,513,390 B1 | * | 2/2003 | De La Puente et al. | 73/800 |
| 6,647,800 B2 | * | 11/2003 | De La Puente et al. | 73/800 |
| 6,650,405 B2 | * | 11/2003 | Lam et al. | 73/800 |
| 2003/0126930 A1 | * | 7/2003 | De La Puente et al. | 73/800 |

* cited by examiner

*Primary Examiner*—Max Noori
*Assistant Examiner*—T Miller
(74) *Attorney, Agent, or Firm*—Amin & Turocy LLP; R. Scott Speroff

(57) ABSTRACT

A system and method relating to the measuring of torque in a rotating shaft is provided. An optical torque sensing system comprises a rotating shaft, wherein a sleeve of photo-elastic material overlays a portion of the shaft. A light emitting component delivers light into the photo-elastic material, wherein the light delivered by the light emitting component is directed through the photo-elastic material along an axis of the rotating shaft. A capturing component captures the light that exits the photo-elastic material. The exiting light comprises fringe pattern data, and a computing system computes torsion strain of the shaft based at least in part on the fringe pattern information.

54 Claims, 18 Drawing Sheets

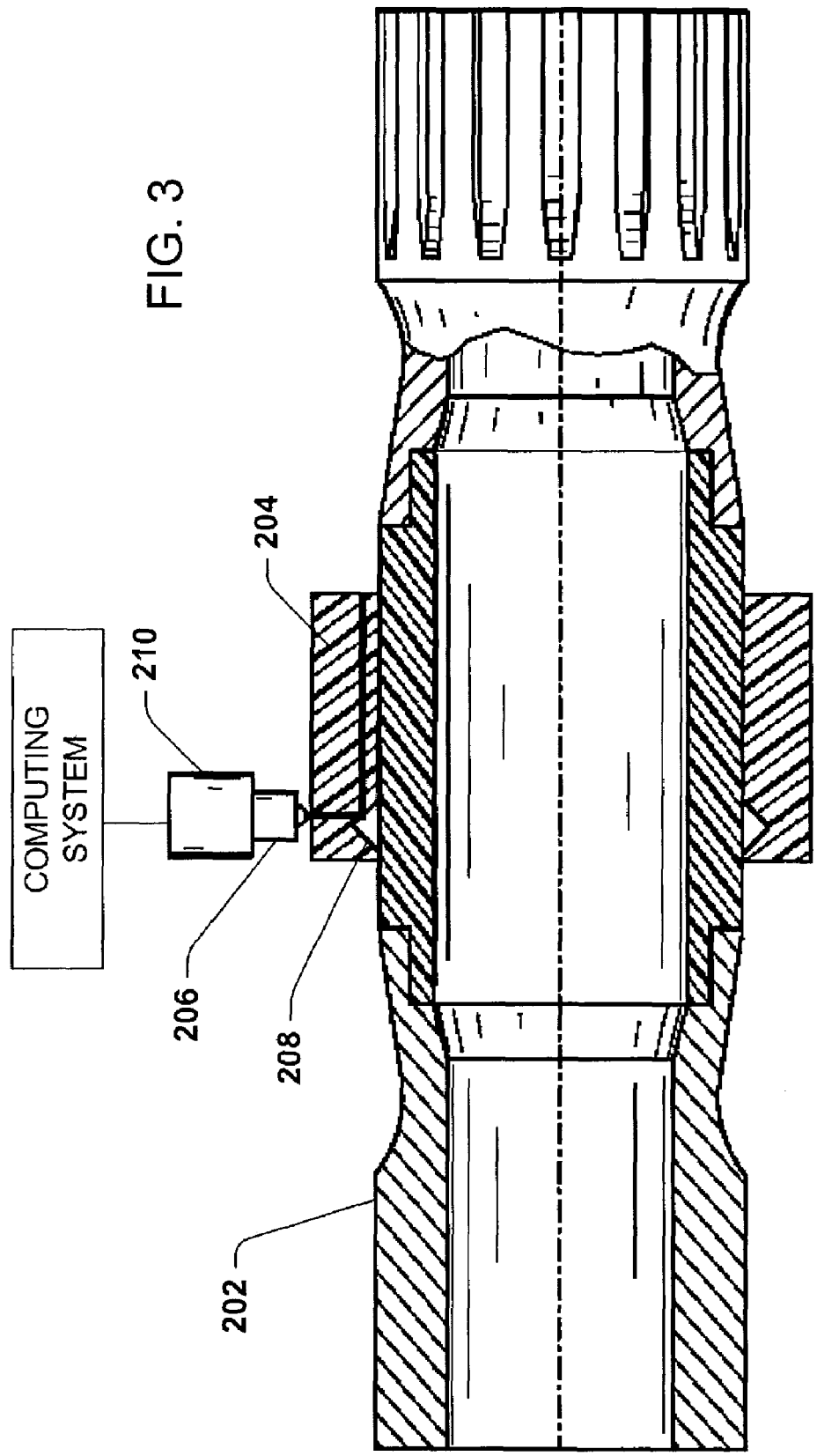

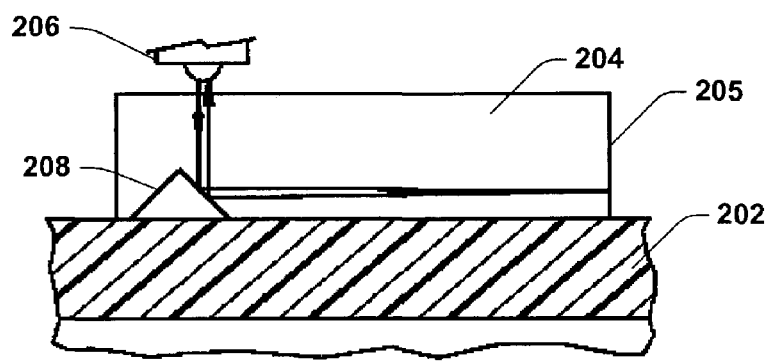
FIG. 4A
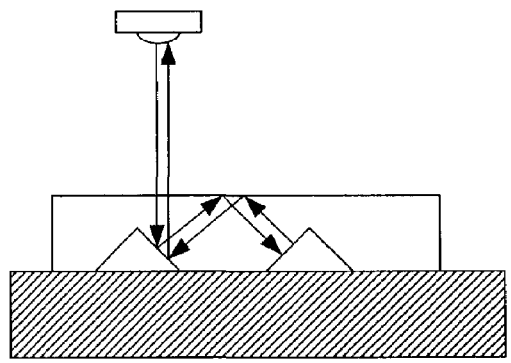 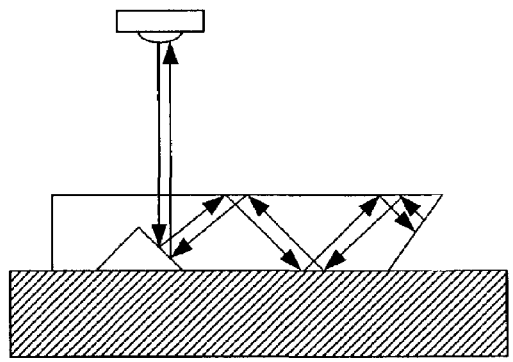
FIG. 4B          FIG. 4C
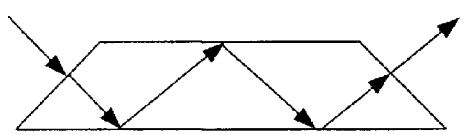 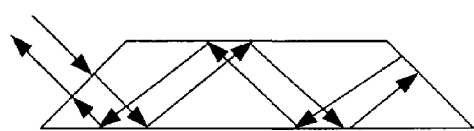
FIG. 4D          FIG. 4E

1318 in-lb        7910 in-lb        15820 in-lb

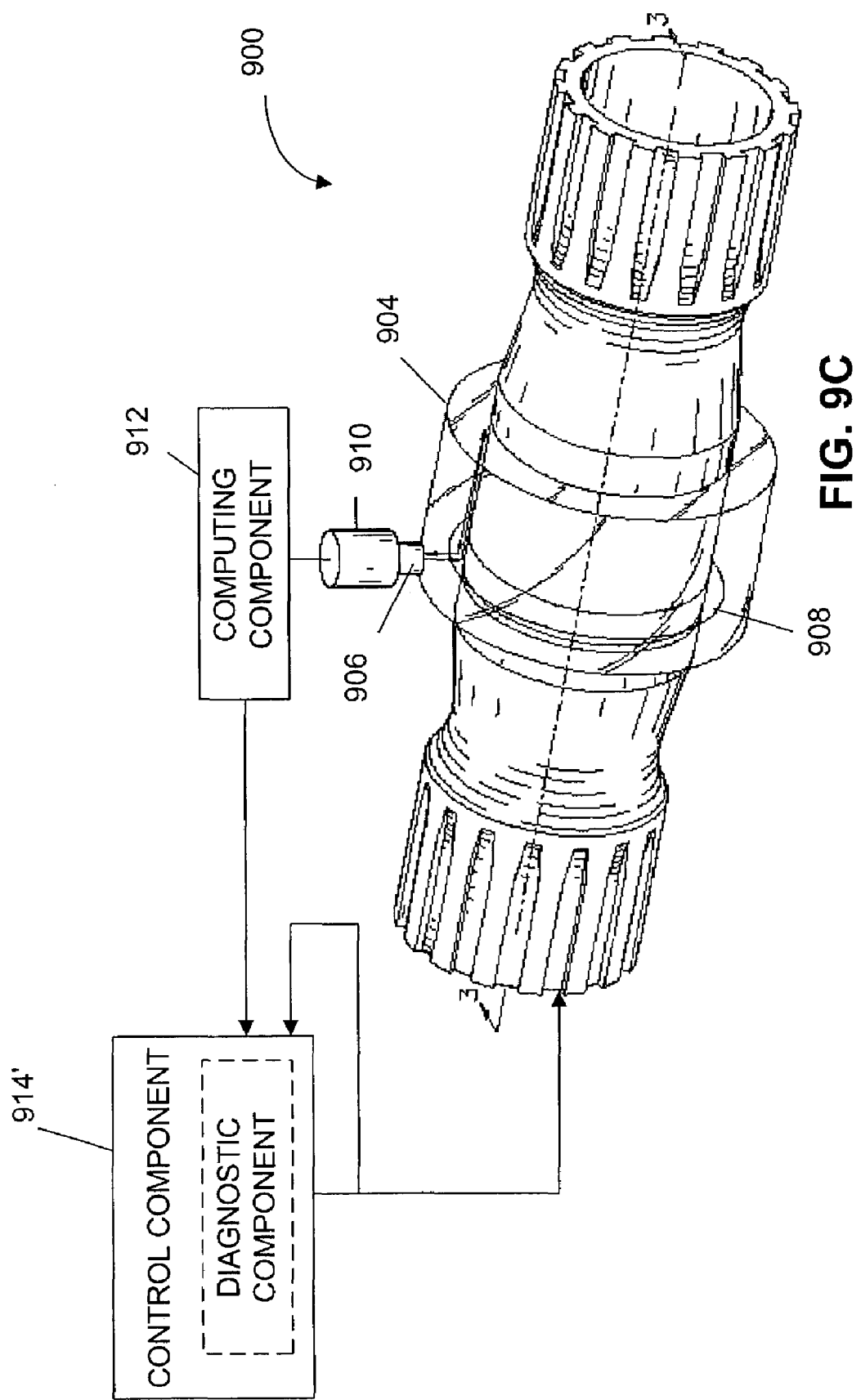

SYSTEM AND METHOD FOR SENSING TORQUE ON A ROTATING SHAFT

CROSS-REFERENCE TO RELATED APPLICATIONS

This application claims the benefit of U.S. Provisional Application Ser. No. 60/371,104 entitled Systems and Methodologies for Enhancing Machine Reliability, filed on Apr. 9, 2002—the entirety of this application is incorporated herein by reference.

TECHNICAL FIELD

The present invention generally relates to optical sensors employed in conjunction with sensing a photo-elastic effect. In particular, the present invention relates to a system and method for obtaining and analyzing data regarding a rotating shaft via an optical torque sensor.

BACKGROUND OF THE INVENTION

Sensors can be found everywhere in today's society—heat sensors are utilized in a common thermostat to activate/deactivate heating and cooling units. Light sensors can be used to govern when to turn on and off automobile headlights (e.g., if the sensor does not receive a predetermined minimum amount of light, a control unit will activate headlights). Even an alarm clock can be thought of as a time sensor, wherein upon sensing a preset time a signal is output from the clock. Dynamic sensing of torque and strain in a rotating shaft would be beneficial towards improving design and analysis of machinery, as well as allowing for torque and strain of a rotating shaft to be utilized as a control parameter in a control system(s). Dynamic torque information also provides an important capability to perform real-time diagnostics for rotating machinery and diagnose mechanical faults thereby predicting and mitigating catastrophic failure. Robust, affordable, lightweight sensing systems for obtaining data regarding a rotating shaft (specifically torque), however, are presently non-existent.

Rotating shafts driving a load are susceptible to torsion strain. Continuous strain on the shaft will eventually result in machine inefficiency and/or shaft malformation and/or breakage. Dynamic torque (strain) fluctuations can cause mechanical and fatigue damage as well as accelerate machine failure. A sensor used to measure torsion strain (torque) on a shaft is therefore be desirable. However, conventional torque sensors are large, costly, and heavy devices. For example, a conventional torsion strain sensing system can weigh approximately 1500 pounds if one desired to measure torque found in a tail rotor of a helicopter. Furthermore, the conventional shaft torque sensing system in the example above would cost at least five thousand dollars, be susceptible to failure due to shock loads, and take up valuable aircraft space and payload capacity. Conventional sensing systems that consider angular displacement difference between two ends of a rotating shaft typically involve costly and complex optics and mechanical interconnect equipment.

Using a property of photo-elasticity in conjunction with optical sensors to measure torque on a rotating shaft is one prior art method to mitigate disadvantages of conventional torque measuring systems. Optical sensing systems are desirable because they are compact and lightweight in comparison to conventional electric or magnetic sensors, and have significantly greater immunity to electromagnetic interference as compared to many conventional systems. Furthermore, optical sensing systems can be produced inexpensively and allow for quick replacement/repair of the system. Lastly, optical sensing systems can provide high frequency torque signals unobtainable with conventional torque sensor(s).

The property of photo-elasticity has been used to measure strain on materials for over fifty years. The method of determining strain relies on the birefringence property exhibited by transparent plastics (i.e., light waves are split into two parallel waves which are polarized perpendicularly). In particular, the phenomenon of load-induced birefringence is utilized where a material becomes birefringence under influence of external loading. In practice, polarized light is delivered into a photo-elastic material wherein a strain in the photo-elastic material is encountered. The normally incident polarized light is split into two components along principal strain directions in a plane perpendicular to direction of light propagation and are transmitted only along these planes through a photo-elastic material. The velocities of light transmission along these directions is directly proportional to magnitude of respective principal strains. The light is then passed through a second polarizer, which results in a two-dimensional light-intensity pattern—the strain on the material can be deduced by inspection of the resulting light-intensity pattern.

FIG. 1 illustrates an exemplary cross-sectional view of a prior art optical sensing system 100 which can be employed to measure torque on a rotating shaft. The sensing system 100 includes a light emitting component 102, a capturing component 104, and strips of photo-elastic material 106. The strips of photo-elastic material 106 encircle a rotating shaft 108, and interiors of the strips of photo-elastic material 106 are coated with a reflective substance such as an aluminum filled epoxy. In operation, the light emitting component 102 releases a beam of light into a strip of photo-elastic material 106. The light reflects off of a reflective interior surface of the strip of the photo-elastic material 106, and back out through the photo-elastic material and into the capturing component 104. A light-intensity pattern is visible from the light exiting the strips of photo-elastic material 106. The light-intensity pattern is a spectrum of colors known in the art as a fringe pattern, wherein each fringe is comprised of a band of colors. The number of fringes, narrowness and proximity of the fringes in the fringe pattern indicate the amount of strain experienced in the photo-elastic material, and therefore indicate the amount of strain on the rotating shaft 108.

The subject invention as described below provides for significant improvements over the aforementioned prior art systems and addresses unmet needs with respect to the amount of shaft data desired in connection with rotating shafts.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides for an optical sensing system that facilitates measuring torque in a shaft and gathers significantly more data than the aforementioned prior art systems, and accordingly provides a more comprehensive analysis with respect to shaft analysis. Light emitted from a light source is directed through a photo-elastic material in an axial direction along a rotating shaft, thus allowing for a significantly greater amount of coverage area from which the sensor can detect torsional strain, for example. The optical sensing system of the subject invention can also be used for high-frequency load sensing, lateral load sensing, and surface monitoring as well as measuring rotational speed, displacement, acceleration, vibration, temperature, stress, etc. Through use of external storage and display components, properties of the shaft (e.g., torque, rotational speed, displacement . . . ) can to stored and/or displayed, wherein the properties to be stored and/or displayed are predefined and/or user defined and/or dynamically determined based on context as well as user state. Thus, the invention provides a flexible and robust system and method for determining torque on a rotating shaft while minimizing weight and cost of a corresponding sensing device.

In accordance with one aspect of the present invention, a portion of a rotating shaft is encircled by a sleeve of photo-elastic material, wherein the photo-elastic sleeve is attached to the shaft. For example, the photo-elastic sleeve can be cast, machined, or even sprayed onto the shaft. A light source is employed to deliver light that will travel along the axis of the shaft through the photo-elastic sleeve. The light source can be placed at any suitable angle to the rotating shaft, so long as the light delivered is redirected through the photo-elastic sleeve along the axis of the shaft. For instance, a light source can be configured to deliver light perpendicularly to the shaft into the photo-elastic sleeve, wherein the light is redirected by a reflective notch (e.g., v-groove) cut at an angle (e.g., 45°) to the light source, thereby redirecting the light along the axis of the shaft. V-groove faces can optionally be covered with a thin strip of reflective material (e.g., Mylar®) to provide a specular surface with minimal light distortion. At least one end of the collar of the photo-elastic material can be coated with a reflective substance (e.g., aluminum filled epoxy), thus requiring a beam of light emitted from a light source to reflect back along the same path. Requiring a beam of light to traverse the photo-elastic sleeve twice (e.g., once prior to reaching the reflective edge and once upon reflection) results in a more thorough analysis of strain on the shaft. Since a number of fringes (discussed in greater detail below) increases linearly with optical path length, sensitivity of the optical sensing system is also increased as a function of length of the photo-elastic material. It is to be understood, however, that a reflective substance on a collar of the photo-elastic sleeve is not required to practice the invention, as strain on the shaft can be determined when a beam of light passes through an end photo-elastic sleeve an data collected at such end as compared to the light reflecting backward from such end.

As stated supra, light exiting a photo-elastic material produces a fringe pattern, wherein areas of narrow, grouped fringes can be indicative of areas of strain concentration. When a beam of light travels through a photo-elastic material, the index of refraction of the light is altered as a function of difference in principal strains. When viewed through polarizing filters, the light returning exiting the photo-elastic material exhibits a fringe pattern which is a function of material strain, wavelength of light, material thickness, and material strain-optic coefficient. A capturing device utilizing polarizing filters, such as for example a digital camera or an optical sensing chip can be employed to capture the beam of light (the fringe pattern) exiting the photo-elastic material. The strain of the photo-elastic material, and thus the strain on the rotating shaft can then be determined using an optical inspection device. Alternatively, a computing component in response to output from the capturing device can determine the torsion strain on the rotating shaft.

The subject invention can be implemented with any rotating shaft that may incur strain from driving a load. For example, the invention could be employed to determine the torque and strain on a turbine drive shaft, a drive shaft on a truck or automobile, a shaft driving a helicopter blade, etc. The invention can also be coupled to a control system, thereby protecting the shaft from failure due to excessive torque. A control system can also be employed in connection with the present invention to control operation of the shaft by utilizing one or more parameters that can be sensed by the sensor (e.g., rotational speed, acceleration, displacement, vibration, temperature, torque, stress . . . ). For example, this provides an effective method for constant torque control. Furthermore, the invention can be used in connection with a diagnostic system, wherein upon reaching a critical point of strain the diagnostic system will inform an operator that repair or replacement of the shaft is necessary. In another embodiment, a prognostic system utilizing inferential techniques can be employed to predict a time in the future when repair or replacement of the shaft will be necessary. Lastly, high frequency analysis of the torque signal using established frequency domain or joint time-frequency methods can be a very effective, low cost, diagnostic tools. Also, the broad inspection sensing area can provide a capability to inspect composite joint(s) dynamics.

To the accomplishment of the foregoing and related ends, the invention then comprises the features hereinafter fully described and particularly pointed out in the claims. The following description and the annexed drawings set forth in detail certain illustrative aspects of the invention. These aspects are indicative, however, however, of but a few of the various ways in which the principles of the invention may be employed an the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 3 is a cross-sectional diagram of the exemplary optical torque sensor of FIG. 2 in accordance with an aspect of the present invention.

FIG. 4A is an enlarged view of the exemplary optical torque sensor of FIG. 2 in accordance with an aspect of the present invention.

FIGS. 4B–E illustrate employment of photo-elastic material in a variety of shapes/configurations in connection with directing light in accordance with the subject invention.

FIGS. 9A–9C illustrate exemplary optical torque sensor(s) used in conjunction with a control system in accordance with an aspect of the present invention.

DETAILED DESCRIPTION OF THE INVENTION

Figure 1:
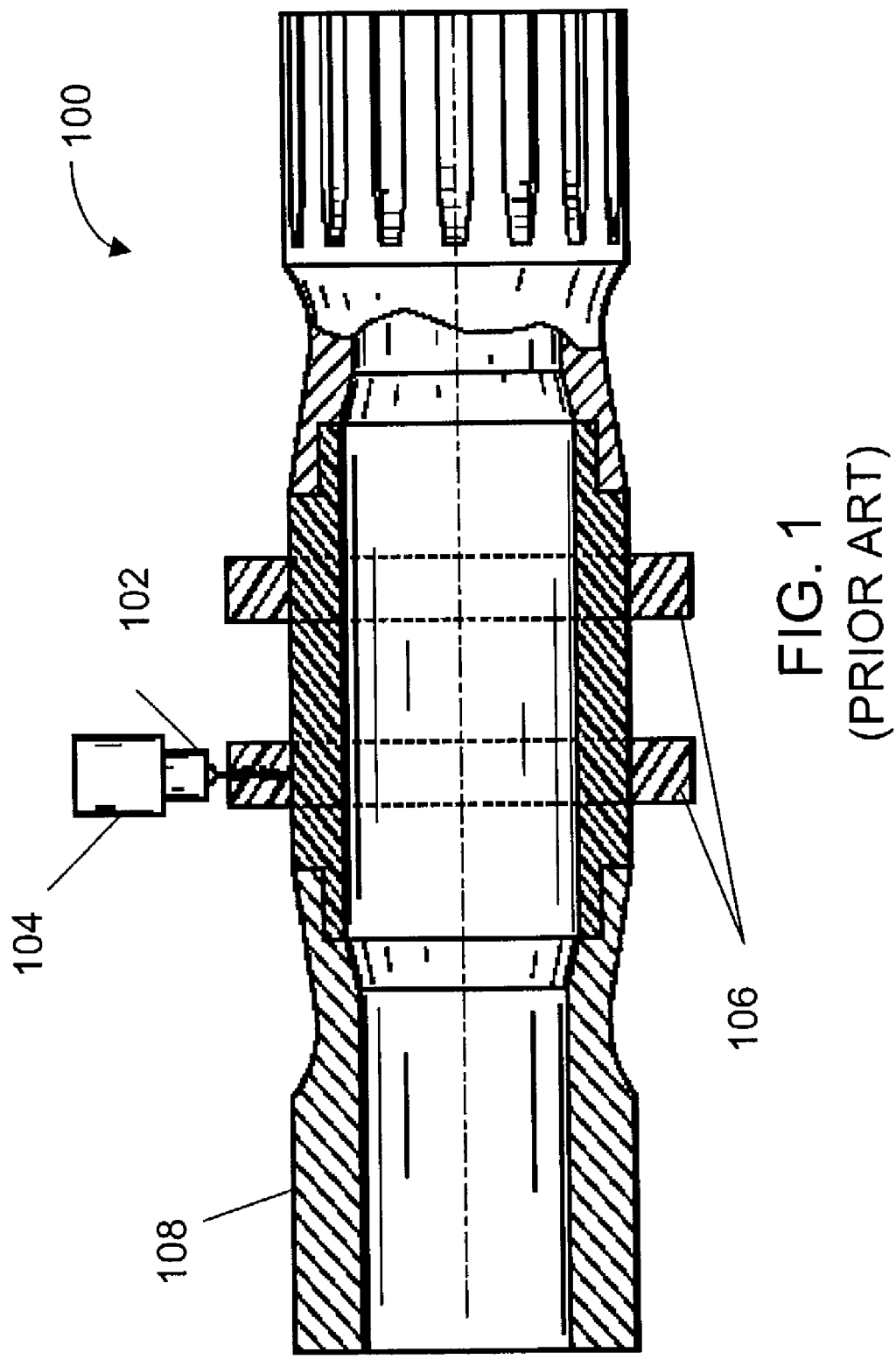
FIG. 1 is a diagram of an optical torque sensor of the prior art.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" or "system" are intended to refer to a computer-related entity, either hardware, a combination of hardware and software, software, or software in execution. For example, a computer component can be (but is not limited to) a process running on a processor, a processor, an object, an executable, a thread of execution, a program, and/or a computer. By way of illustration, both an application running on a server and the server can be a computer component. One or more computer components may reside within a process and/or thread of execution and a component can be localized on one computer and/or distributed between two or more computers.

The subject invention can incorporate various inference schemes and/or techniques in connection with effecting a user interface for object management and manipulation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Figure 2:
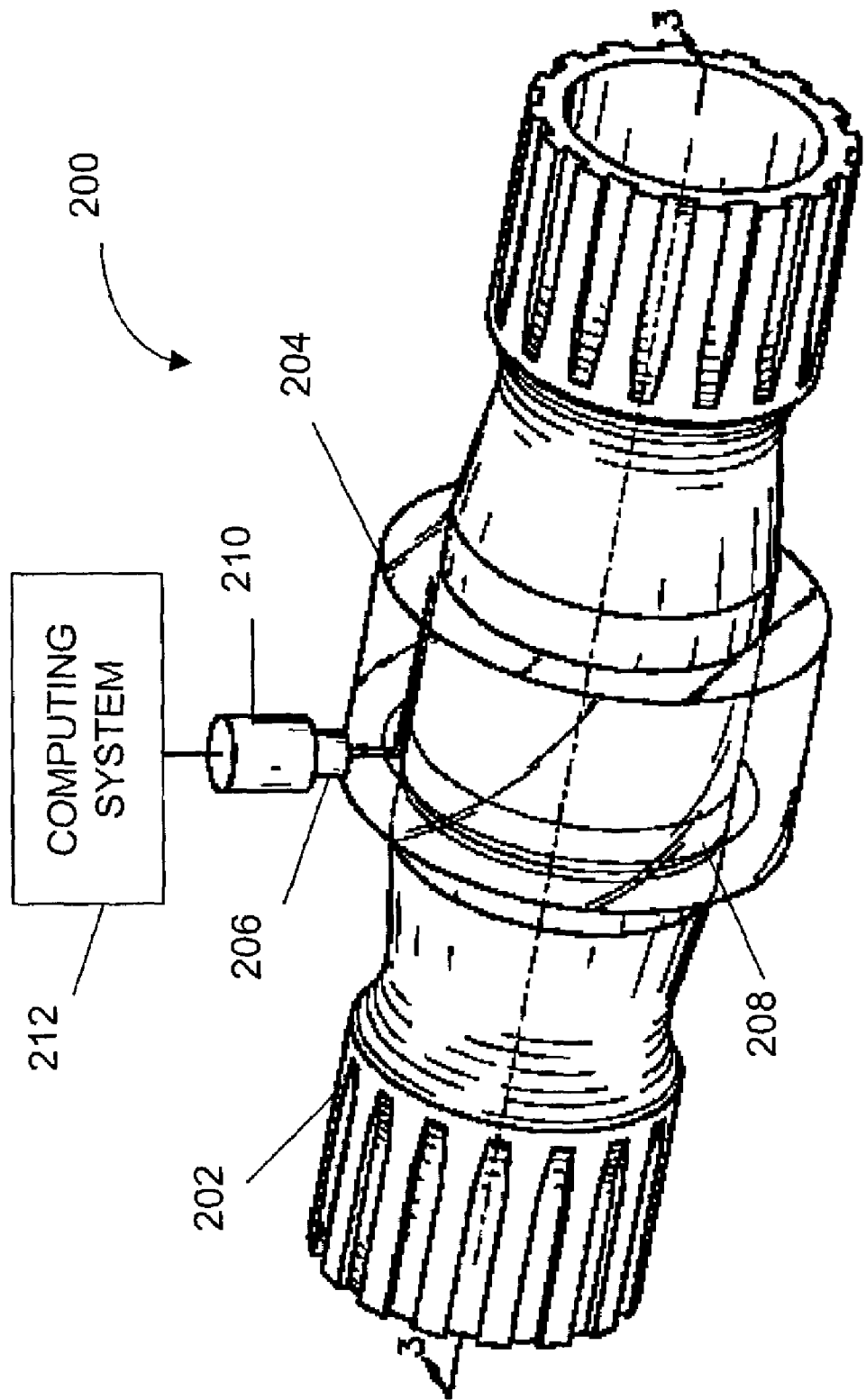
FIG. 2 is a perspective diagram of an exemplary optical torque sensor in accordance with an aspect of the present invention.

Referring now to FIG. 2, there is illustrated a perspective view of an exemplary optical torque sensing system 200 in accordance with one aspect of the present invention. The optical torque sensing system 200 comprises a rotating shaft 202, wherein a portion of the rotating shaft 202 is encircled by a sleeve of photo-elastic material 204. Although the rotating shaft displayed in FIG. 2 is cylindrical, it is to be understood that a shaft of any shape (e.g., triangular, square, octagonal . . . ) can be used in conjunction with the present invention, and the photo-elastic material conformally formed about at least a circumferential portion of the shaft 202. Generally it would be desirable for the sleeve of photo-elastic material 204 to be a lightweight, durable, and inexpensive material such as polycarbonate. However, it is to be understood that the present invention contemplates employment of any suitable photo-elastic material or the like capable of conducting electromagnetic energy (e.g., white light). For example, polycarbonate-based compounds, polyester-based compounds, polysulfone-based compounds, polyether sulfone-based compounds, polystyrene-based compounds, polyolefin-based compounds, polyvinyl alcohol-based, cellulose acetate-based compounds, polyvinyl chloride-based weight compounds, polymethyl methacrylate-based compounds, polyacrylate-based compounds, polyamide-based compounds and/or a combination of the above may be employed in connection with the invention.

Figure 5:
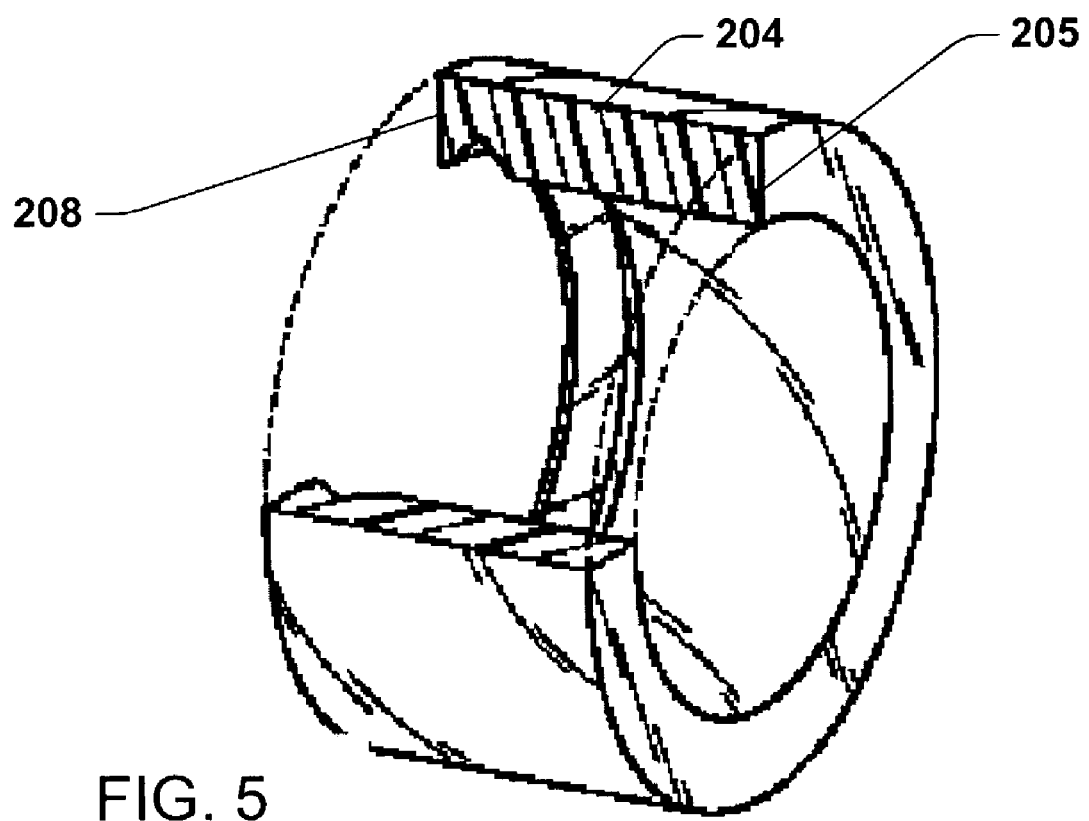
FIG. 5 is a perspective cut-away view of an exemplary photo-elastic sleeve in accordance with an aspect of the present invention.

The optical torque sensing system 200 further comprises a light emitting component 206 that delivers light into the photo-elastic sleeve 204. The light emitting component 206 can be a light emitting diode (LED), a laser diode, incandescent lamp, or any other adequate source of light. In accordance with one aspect of the present invention, the light-emitting component 206 delivers light perpendicularly into the photo-elastic material 204. Turning briefly to FIGS. 3–5, alternative views of the exemplary optical torque sensing system of FIG. 2 are displayed. FIG. 3 displays a cross-sectional view of the optical torque sensing system 200, FIG. 4 displays an enlarged view of the photo-elastic sleeve 204 and the light-emitting component 206, and FIG. 5 displays a perspective cut-away view of the photo-elastic sleeve 204. As illustrated in FIGS. 3–5, the photo-elastic sleeve 204 includes a notch 208, wherein edges of the notch (e.g., v-groove) 208 are at an angle (e.g., 45°) to the light delivered by the light emitting component 206. The notch can be employed as a beam splitter if desired so as to direct light in more than one direction so as to facilitate interferometric based analysis of the shaft. The notch 208 can be coated with a reflective substance to facilitate directing the light through the photo-elastic sleeve 204 along a longitudinal axis of the rotating shaft 202. It is to be appreciated, however, that a notch with an angle is not required to practice the present invention. For example, the light emitting component 206 can be configured to initially deliver light along the axis of the rotating shaft 202, thereby not requiring a notch in the photo-elastic material 204. The present invention is meant to include any method of directing light through a photo-elastic material along the axis of a rotating shaft. For example, mirrors can be employed to direct the light in accordance with the present invention. Accordingly, any suitable means for directing light about a predetermined portion of the shaft is contemplated and intended to fall within the scope of the hereto appended claims.

The light travels along the axis of the rotating shaft 202 until an edge 205 of the photo-elastic material 204 is reached. In accordance with an aspect of the present invention shown in FIG. 4, a collar of the photo-elastic sleeve 204 is coated with a reflective substance such that the light will reflect back through the photo-elastic sleeve 204. The length of the path traveled by the light is thus doubled, thereby increasing sensitivity of the optical torque sensing system 200.

In another aspect of the present invention, the collar of the photo-elastic sleeve 204 is not coated, thereby allowing the light to exit the photo-elastic sleeve 204—a collection device/system can be placed at the exit portion of the sleeve to gather the light and pass the data in connection therewith to a processing system to analyze the data in connection with determining and/or inferring properties and/or states with respect to the shaft and/or machine(s) utilizing the shaft. Thus, the invention provides for collecting information regarding the shaft from at least two orthogonal directions with respect to the shaft.

It is to be appreciated that in lieu of a sleeve or collar based photo-elastic material, the invention can employ the photo-elastic material in a variety of shapes/configurations (e.g. strip, block, triangle, angles that allow for multiple traverses of light through axial length, use of shapes to split beams in multiple directions (+ and −axes) along axial length . . . )—as illustrated in FIGS. 4A–4E—to accommodate a particular shape of a shaft and facilitate collection data about a surface thereof. Moreover, it is to be appreciated that the photo-elastic material can have dopants, photosensitive materials (e.g., europium chelates), gratings etcs. embodied therein to facilitate gathering data regarding the shaft (e.g., pressure, temperature, velocity, acceleration . . . ).

Returning to FIG. 2, when the light exits the photo-elastic sleeve it is captured by a capturing component 210. The capturing component is typically placed wherever the light delivered by the light-emitting component 206 exits the photo-elastic sleeve 204. The capturing component 210 can utilize polarizing filters to capture the fringe pattern that results from polarized light encountering strain in the photoelastic material 204. The capturing component 210 relays data relating to the shaft to a computing system 212 for processing. In accordance with one particular aspect of the present invention, the capturing component 210 is a digital camera, wherein the captured fringe pattern can be quickly relayed to the computing system 212 as digital data. It is to be appreciated that analog data can be passed to the computing system 212 as well and analyzed in accordance with the present invention. The capturing component 210 can also be a CCD array, a linear detector array, or a group of separate optical detector elements.

Measurements of stress and strain have proven to be extremely valuable tools applicable to a wide range of machinery design, analysis, and control systems. The subject invention via employing a photoelastic material is widely applicable various industrial applications to sense dynamic loading and torque on a rotating shaft. For example, the system 212 can provide a measurement of speed, steady state torsional load (torque) and dynamic loading of a composite drive shaft (e.g., driving a rotor gearbox). Such drive shafts can for example be used in aircraft like a helicopter tail rotor drive shaft or in a high temperature superconducting motor. The measured torsional load signal can be accurate and can indicate when critical load thresholds are exceeded. A high frequency torque signal beyond 10 kHz for example can be obtained from this system 212. Real-time information on dynamic loading of the mechanical system can provide valuable information describing actual system stresses experienced and can provide early indication of mechanical component degradation or unusual operation such as impact loading. For example, dynamic loading information during aircraft operation can be interpreted in a frequency domain or joint time-frequency domain. This information can indicate early stage degradation or the existence of incipient faults in gears, bearings, tail rotor, or other rotating mechanical components. Analysis of sampled high frequency load information can indicate occasional load pulses or transient loads that exceed a threshold where component damage is occurring. The subject invention can sense both torsional and axial loading in steady state and transient loading conditions. Such design permits surface area inspection and the detection of bending moments or changes in axial loading. The optical shaft load sensing system provides novel and important prognostics and control information that can lead to reduced probability of component failure and reduced weight of key mechanical components.

Figure 6A:
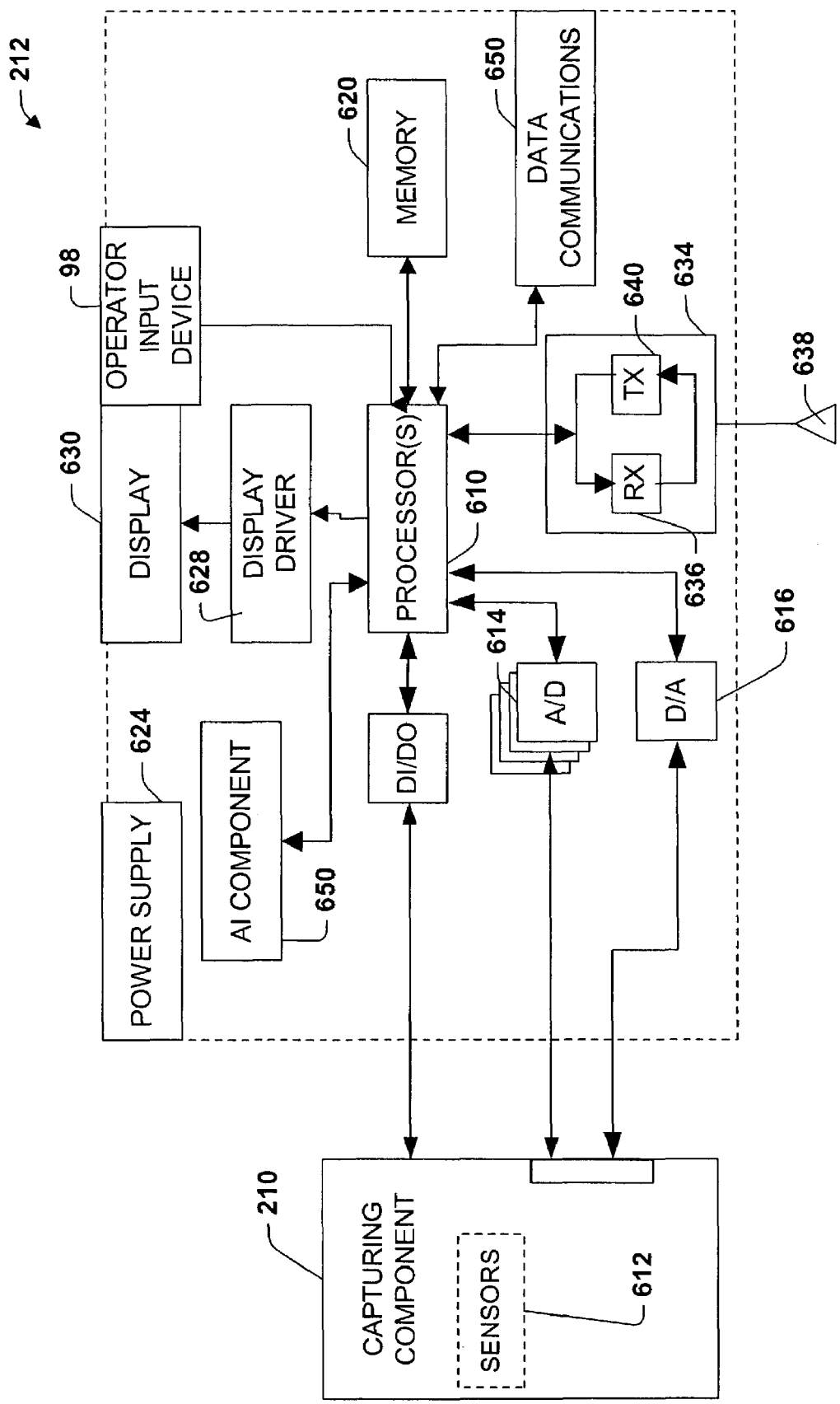
FIG. 6A illustrates details of one particular exemplary implementation of a computing system in accordance with the subject invention.

FIG. 6A illustrates further details of one particular exemplary implementation of the computing system 212 in accordance with the subject invention. The system 212 includes processor(s) 610 that analyze information received from the capturing component 210. The capturing component 210 can optionally include and/or be operatively coupled to sensor(s) 612 that collect other types of data (e.g., vibration, temperature, pressure, humidity, voltage, current . . . ) that can be utilized to facilitate gleaning information regarding the shaft 202 and machinery employed in connection therewith. To this end, the capturing component is coupled to the processor(s) 610 via A/D converter 614 and/or D/A converter 616. As noted supra, the system 212 can process analog and/or digital types of data. The A/D converter for example can be an array of 4, 8 or more elements in parallel or serially.

The system 212 includes a memory 620 that stores program code, base-line information (e.g., nominal torsion, acceptable strain, expected stress, loading information, duty cycle data, and appropriate torsion values, nominal optical intensity values, neural network parameters, or fuzzy logic rules and functions), machine specific data, acceptable error bounds/deviations, historical torque parameter data, recommended corrective action and/or historical operating and torque data. The system 212 may also include a power supply 624 (that provides power to the processor(s) 610, sensors 612 and other components—the system can be self-powered via scavenging energy from the environment such as utilizing a rotating shaft (e.g., Farady effect), vibration (e.g., piezo-electric actuators) or illumination (e.g., photovoltaic cells)), a display driver circuit 628 (that couples the processor(s) to the display 630), RF section 634

(that includes a receiver 636, an antenna 638, a transmitter 640 that transmits and receives signals.

It is to be appreciated that the system 212 can function as and/or employ an interferometer in connection with analyzing light exiting the photoelastic material.

The system 212 can further include an artificial intelligence (AI) component 650 that can be employed in connection with performing automatic and/or inferred action in connection with the subject invention. The AI component can employ any of a variety of suitable classification schemes and/or systems (e.g., support vector machines, neural networks, expert systems, Bayesian belief networks, Hidden Markov Models, fuzzy logic, data fusion engines, non-linear training systems . . . ) in connection with the subject invention. The AI component can include seed classifiers that have been explicitly trained as well as classifiers that are implicitly trained. The AI component 650 can facilitate diagnosing as well as prognosing states with respect to the shaft as well as machinery employed in connection therewith.

The system 212 is designed to provide highly accurate and up-to-date information regarding the state and future state of the shaft 202 as well as if desired related machinery and process operations. The system 212 can compare known and measured data with acceptable parameters and projected shaft aging to establish a recommended maintenance action and when such maintenance should be performed. This information can be communicated to an operator or other computer system as appropriate. Alternatively, predicted state information can be used to prescribe a change in control such as to avoid reaching a defined level of torsion loading.

It is to be appreciated that the system 212 can perform substantially all analysis with respect to the shaft 202 and/or a portion of such analysis. The wireless component 634 and/or data communications component 650 can be employed to provide the data and/or analysis to other computing systems. Moreover, with respect to powering the system 212, a magnetic field can be employed in connection with a rotating component of the shaft, to make the system 212 self-powering.

In one embodiment of the subject invention, the computing system 212 can determine torsion strain found in the rotating shaft 202 in real time via a fringe pattern. The image sent to the computing component 212 can be in digital or otherwise, and in color or grayscale. Furthermore, the computing component 212 can convert a color image delivered from the capturing component 210 into a grayscale image (and vice versa), and convert an analog image into digital data. A grayscale image can be beneficial because the computational cost of processing a grayscale image is generally less than the computational cost of processing a color image.

The computing component 212 can also utilize diagnostic and prognostic techniques in order to inform an operator on the present/future state of the rotating shaft 202. For example, the computing component can use diagnostic techniques to inform an operator that the current torsion strain on the rotating shaft 202 is too great. Furthermore, the optical torque sensor 200 can create an image of the entire surface of the portion of the rotating shaft 202 encircled by the photo-elastic sleeve 204 upon one rotation of the rotating shaft. The computing component 212 can thus determine any malformations in the rotating shaft 202 and utilize a diagnostic system to inform an operator that the rotating shaft 202 needs replaced/repaired. Such component can also be used to inspect a coupling joint (e.g., composite shaft coupling).

Alternatively, the computing component 212 can use prognostic techniques to approximate a future time when replacement/repair of the rotating shaft 202 will be necessary. The computing component 212 can use inferential techniques based on the operation and tasks, prior tasks, etc. to determine a future state of the rotating shaft 202. The use of prognostic techniques in connection with the present invention has several advantages deriving from the predictability of shaft failure, including shaft replacement, decreased storage costs, decreased shipping costs, convenience, decreased downtime, improved operation, etc. For example, in the case of a rotating shaft within a machine utilized on a production line, the optical torque sensing system 200 could be utilized in conjunction with prognostic techniques to schedule repair and/or replacement. Therefore the operator of the machine would know when to have replacement parts available and could schedule repair of the shaft at a time when production loss would be minimized. Because the optical sensing system 200 of the present invention can be employed not only to determine torsion strain but also rotational speed, displacement, acceleration, vibration, temperature, longitudinal strain, axial strain, high-frequency load sensing, lateral load sensing, and surface monitoring, diagnostic and prognostic techniques utilized in connection with the present invention can be extremely accurate.

As noted supra, the computing system 212 can employ explicitly as well as implicitly trained classifiers in connection with inferring which parameters (e.g., rotational speed, acceleration, torsion strain, . . . ) regarding a rotating shaft to compute and/or relay information to other external components (e.g., a control component, a display component, a storage component . . . ). For example, the computing system 212 can be implicitly trained by watching an operator over time to learn how the operator typically controls and protects the shaft. The computing component 212 can employ a utility-based analysis wherein the cost of computing and/or relaying undesired shaft parameters can be factored against the benefits of computing and/or relaying desired shaft parameters in connection with a particular operator and operating state.

The present invention has several advantages over the prior art in that the invention is lightweight, small, reliable, and inexpensive while maintaining a large coverage area of the rotating shaft 202. The ability to monitor a large surface area of a rotating shaft and the determination of longitudinal strain are other novel aspects of the subject invention. The present invention is also capable of a much more accurate measure of torsion strain as compared to prior art torque measuring systems, as the sensitivity of an optical sensing system utilizing the photo-elastic effect depends on distance traveled by the light through the photo-elastic material. Because the light delivered by the light emitting component 206 is directed along the axis of the rotating shaft 202, the length of the path traveled by the delivered light in the present invention is generally significantly greater than the length of the path traveled by the light in the prior art (e.g., that prescribed a radial light path).

Figure 6B:
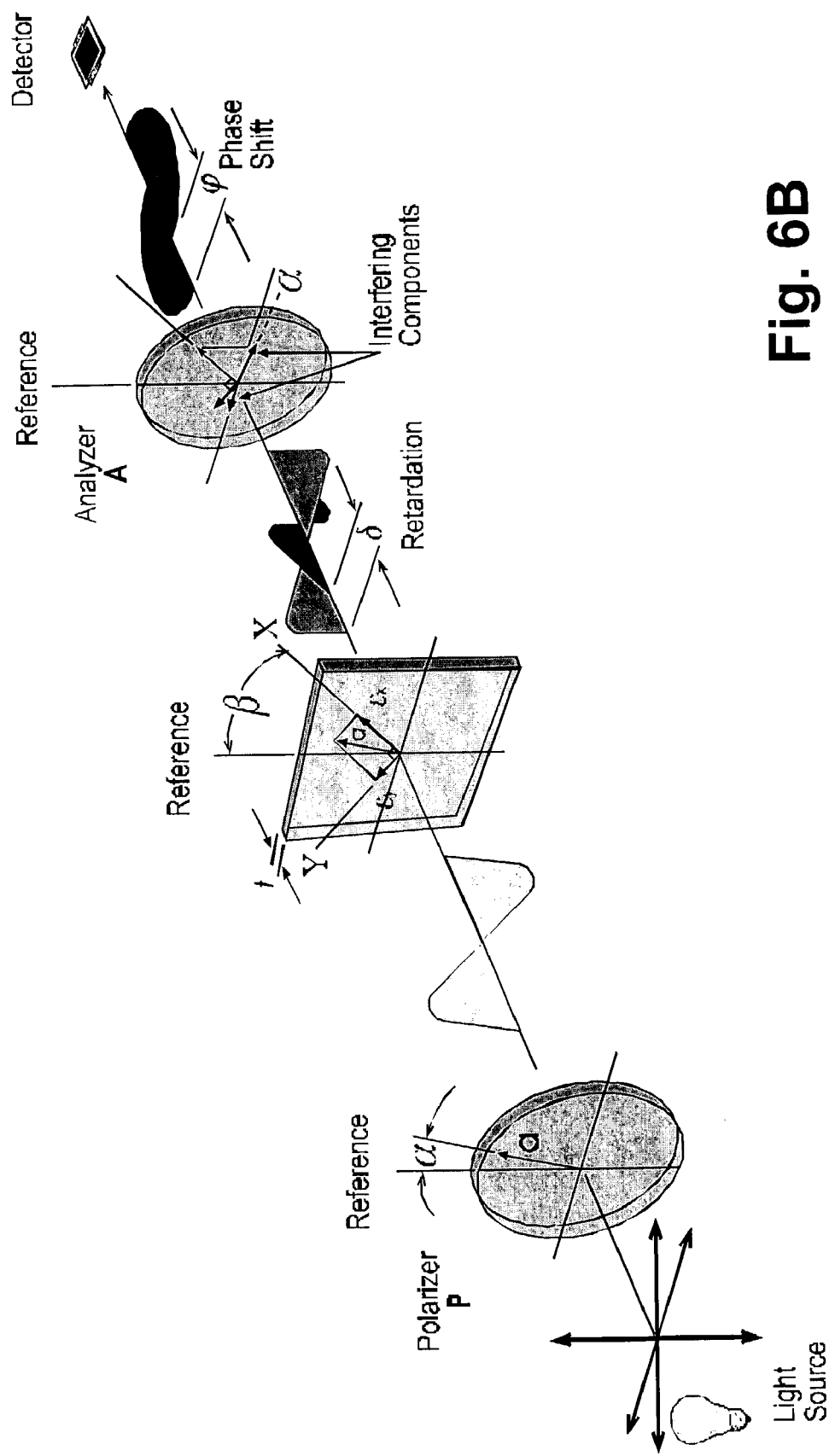
FIG. 6B illustrates a photoelastic effect in accordance with the subject invention.

FIG. 6*b* illustrates a photoelastic principle in accordance with the subject invention. The photoelastic principle can provide a qualitative analysis of deformation or residual strain in manufactured components. A polymeric material in accordance with the subject invention can be cast, machined, extruded, or even sprayed on a part. Typically, an expert interprets the fringe pattern—areas of narrow, grouped fringes represent areas of strain concentration to determine a qualitative estimate of strain in a static (e.g., non-rotating) part.

Many glasses and plastics exhibit an effect called the photo-elastic effect. These materials exhibit a change in the index of refraction as a function of the difference in principle strains. When viewed with polarizing filters, a birefringence pattern is produced. The birefringence pattern is a function of the material strain, wavelength of light, material thickness, and material strain-optic coefficient. The resultant strain (or micro-strain) can be interpreted using an optical inspection device (e.g. polariscope) or alternatively by using a trained classifier or the like. A part under study, such as a drive shaft or other mechanical component, can be coated with the photoelastic material. As the part deforms, a trained classifier observes the resultant fringe pattern from the photoelastic material and determines a resultant component strain or applied torque in the case of a drive shaft. The physics of the photoelastic effect provides many opportunities for integrating the photoelastic material with the component under study. The photoelastic effect can be employed using either transmitted light or reflected light as described herein. The following describes the physics of the photo-elastic effect in accordance with the subject invention.

As a beam of polarized light enters the photo-elastic material, the incoming beam is resolved into two orthogonal circularly polarized components. Each component travels through the material with a different velocity. When the beams exit the material, the phase-retarded beams are passed through a polarizer (analyzer) to generate a two-dimensional intensity pattern. The intensity pattern represents the relative phase shift between the two beams as shown in FIG. 6B.

When linearly polarized light passes through a strained photoelastic material and is viewed through a polarizer, colorful fringe patterns are observed. These two-dimensional optical fringe patterns can be used for stress analysis. According to Brewster's Law, the relative change in index of refraction (n) is proportional to the difference in principal strains ($\epsilon$) as shown in Equation 1. The constant of proportionality, K, is call the "strain-optic" coefficient. The amount of phase shift (e.g., relative retardation $\delta$) is a function of wavelength of light, material thickness, t, strain-optic coefficient, K, and the difference in principal strains, ($\epsilon_1-\epsilon_2$), as shown in Equation 1. The photoelastic effect is typically used in transmission as shown in FIG. 6B or in reflection. The relative phase retardation of the beam exiting the photoelastic material is given by $\delta$ in Equation 1.

$$\delta=t(n_1-n_2)=tK(\epsilon_1-\epsilon_2) \quad (1)$$

Using this relation, the intensity of light, I, exiting the analyzer is given by Equation 2.

$$I=a^2 \sin^2(\pi\delta/\lambda) \quad (2)$$

Where $\lambda$ is the optical wavelength. Note that the intensity of light emerging from the photoelastic material will be zero whenever $\delta=0$, $\delta=1\lambda$, $\delta=2\lambda$, $\delta=3\lambda$, . . . or in general, $\delta=N\lambda$ where $N=[1,2,3, \ldots]$. N is called the fringe order and can be combined with Equation 1 to give:

$$\delta=N\lambda=t(n_1-n_2)=tK(\epsilon_1-\epsilon_2) \quad (3)$$

In (3), t is the thickness of the photoelastic material, $n_i$ is the index of refraction for the i-th component, $\epsilon_i$ is the strain intensity along the i-th axis, and K is a parameter of the material called the strain-optical coefficient.

In accordance with the subject invention, the photoelastic material covers a portion of the shaft material (e.g., in the form of a collar or sleeve). Light enters the material from a radial direction and is reflected off the inside surface thereof, and reflected back through the material in a radial direction where it is sensed with an optical device such as for example a photodiode array. Since the photoelastic material can be used in reflection (rather than just transmission), the light beam passes through the optical material twice. The equation to be used to compute the number of fringes for the torsional load sensor is given by (4).

$$N=2tK(\epsilon_1-\epsilon_2)/\lambda \quad (4)$$

The resulting two-dimensional fringe pattern is quantifiable and reproducible. Therefore, this problem can be viewed as a general, 2-dimensional pattern classification problem. A classifier (e.g., neural network) is well suited to this problem and has been shown to be a fast, efficient, and accurate solution method for this application. A photoelastic sensor in accordance with one specific embodiment of the subject invention can be characterized as a dynamic load sensor due to the broad rand of sensing capabilities and the availability of high frequency torsional load information in addition to speed and low frequency torsional load values (e.g., torque).

Reflecting a radial beam of light through the transparent collar, off the inside surface of the collar, and back out through the collar can provide an image associated with the localized shear of the photo-elastic material and therefore torsional strain of the composite shaft material. Using Young's modulus, strain can be converted to shaft torque. The radial beam of light can be reflect along the axial direction of the photo-elastic material and can provide an image associated with both torsional strain and angular or longitudinal strain of the shaft. The longitudinal strain values can be determined dynamically during shaft rotation. In such mode of operation, an entire circumference of the sensor surface can be imaged during one complete shaft revolution. This technique can be used to indicate localized faults under the sensor element or bending moments of the shaft. Locating the photo-elastic sensor over a shaft joint can provide for complete, dynamic inspection of the joint surface.

Figure 6C:
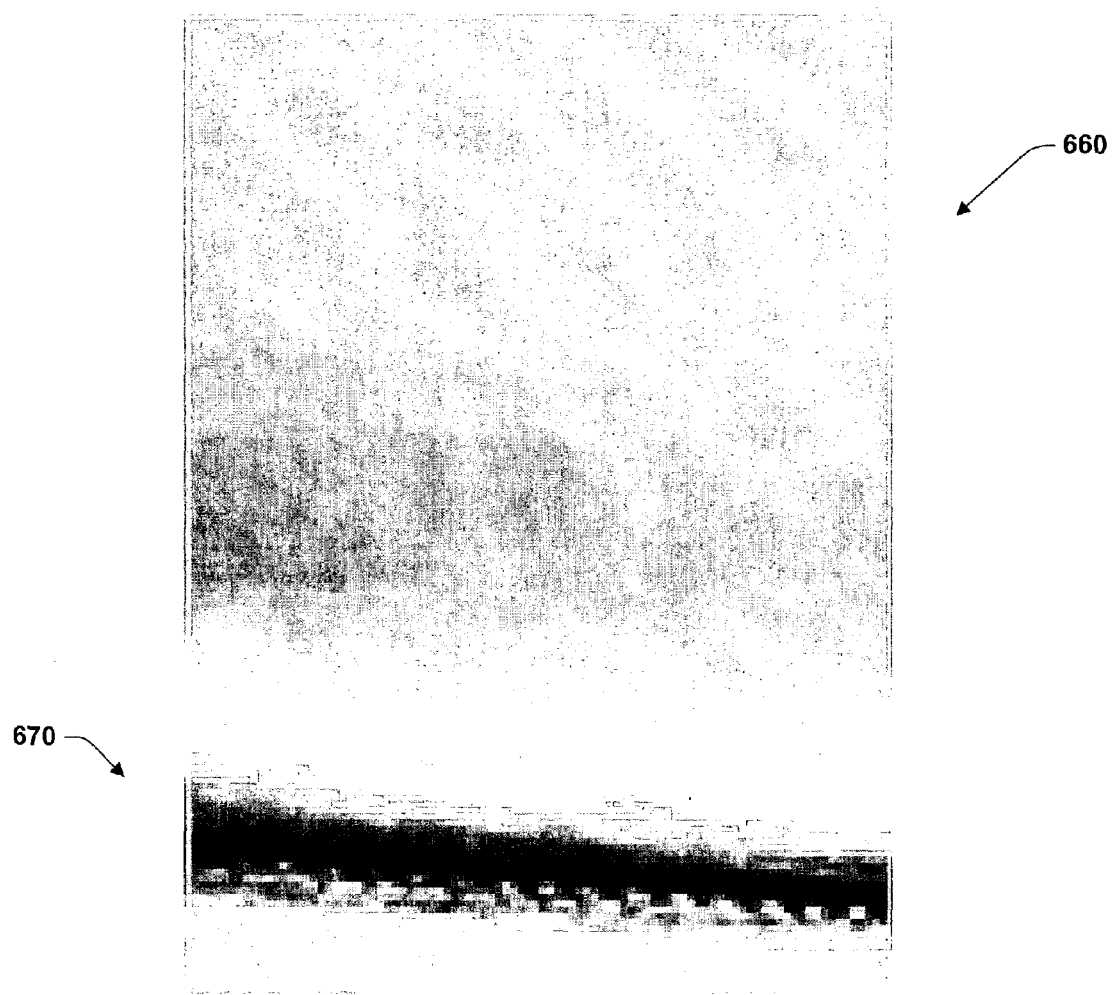
FIG. 6C is an exemplary fringe pattern image in accordance with an aspect of the present invention.

Turning now to FIG. 6C, an exemplary fringe pattern 660 in accordance with one aspect of the present invention is illustrated. The fringe pattern 660 comprises a plurality of light intensities or fringes, wherein narrow fringes in close proximity indicate degree of strain. An area labeled 670 in the fringe pattern corresponds to an area of strain within the photo-elastic material, and thus indicates an area of strain in a rotating shaft. The fringe pattern can be a digital image that can be quickly relayed to the computing system 212. The system can process the data derived from the image in order to measure torsion strain in the rotating shaft.

The sensitivity of the optical system grows with the number of fringes in the fringe pattern, which depends largely on total distance the beam of light has traveled through the photo-elastic material. More specifically, the number of fringes found in a fringe pattern can be calculated using the following equation:

$$N = \frac{dK(\varepsilon_1 - \varepsilon_2)}{\lambda}$$

where d is the total distance traveled by the light through the photo-elastic material, K is the strain-optical coefficient, $\epsilon_1-\epsilon_2$ is the difference in principal strains, and/is the wavelength of the light. The difference in principal strains is directly proportional to the change in index of refraction. As can be discerned from the above equation, the number of fringes in a fringe pattern grows linearly with distance traveled by the light through the photo-elastic material; thus the sensitivity of the sensor depends in large part on the distance traveled by the light through the photo-elastic material.

Figure 6D:
FIG. 6D illustrates analyzing a set of image cells in accordance with the subject invention.
Figure 6E:
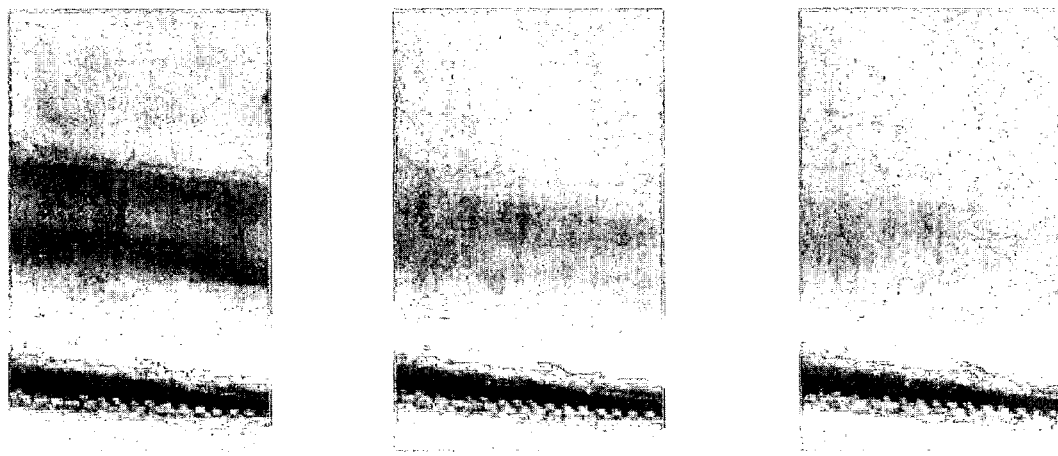
FIG. 6E illustrates several exemplary grey scale fringe patterns corresponding to varying shaft torques in accordance with the subject invention.

Color imaged can be captured and converted to grey scale images—the grey scale images can be input to a classifier to estimate torque applied to the shaft. Classifiers (e.g., neural networks) are excellent functional estimators and can learn functional mapping from intensity patterns to shaft torque. However, an entire image (1280×960 pixels) can represent more than a million sensor elements. This may be too many data points to directly input into a classifier depending on processing and bandwidth capabilities, and in thus some classifiers may not be able to keep stride with the amount of processing necessary to be done in an allotted time fame. In an effort to reduce the number of inputs to the classifier, optionally a set of cells (which are a subset of the captured data) can be used as inputs to the classifier. For example as shown in FIG. 6D, an analyzed pattern can comprise 15 cells where each cell consists of a square array of 1024 image pixels (32×32). All the pixels in a cell can be summed to produce a single input to the classifier corresponding to each cell. All pixels outside the cell boundaries can be ignored. Such technique can be modified and applied in accordance with respective system capabilities. FIG. 6E illustrates fringe patterns for varying shaft torques. The pixels in a cell can be summed digitally or optically (e.g., lens array).

Figure 7:
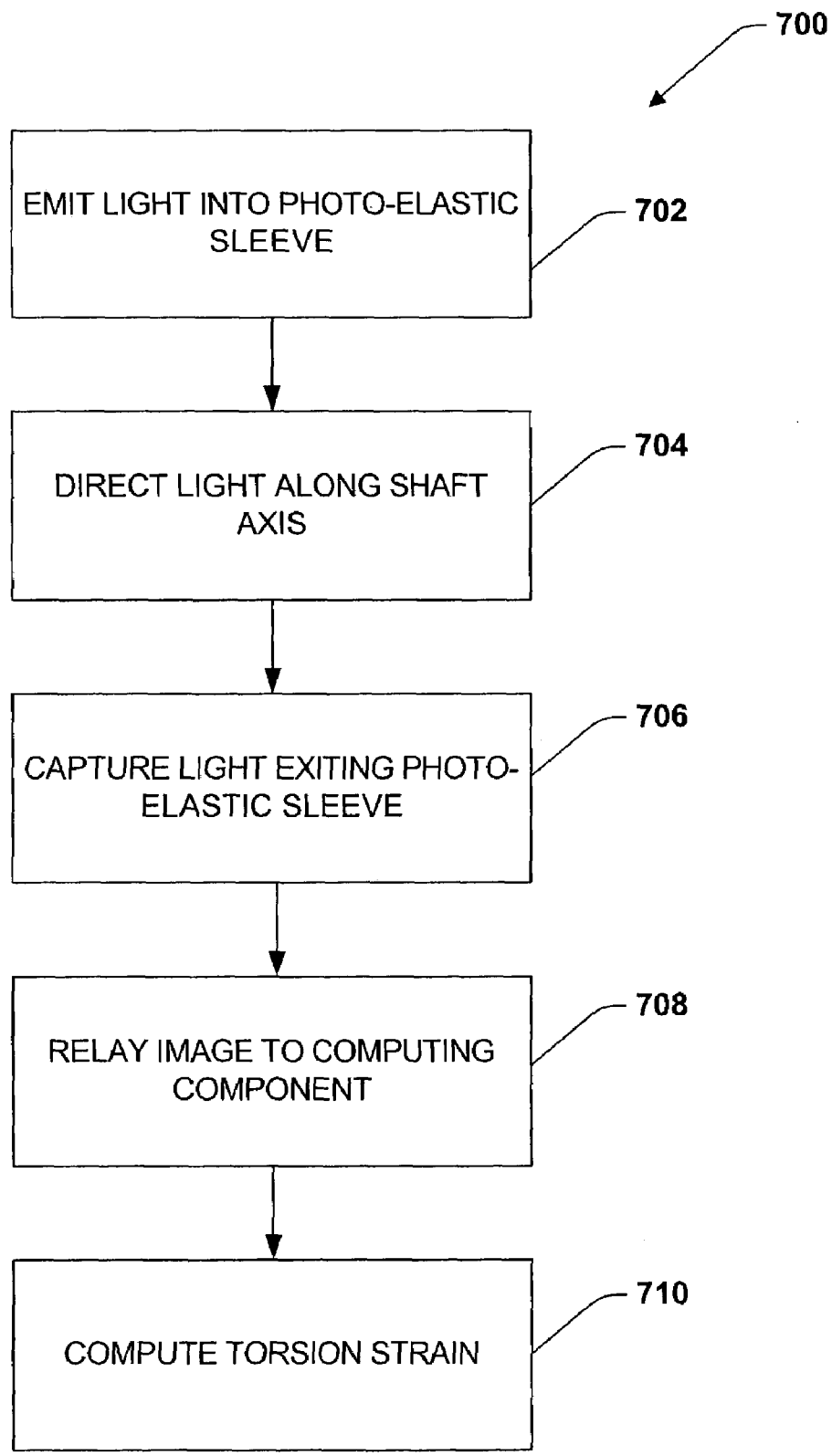
FIG. 7 is a flow diagram of a method that facilitates the sensing of torsion strain on rotating shaft in accordance with an aspect of the present invention.

Referring now to FIG. 7, a method 700 for measuring torsion strain on a rotating shaft in accordance with one aspect of the present invention is illustrated. While, for purposes of simplicity of explanation, the methodologies of the subject invention are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention. The invention may be described in the general context of computer-executable instructions, such as program modules, executed by one or more components. Generally, program modules include routines, programs, objects, data structures, etc. that perform particular tasks or implement particular abstract data types. Typically the functionality of the program modules can be combined or distributed as desired in various embodiments.

At 702 linearly polarized light is delivered to a photo-elastic sleeve which encircles a rotating shaft. The light can be emitted by a Light Emitting Diode (LED), a laser diode, incandescent bulb, or through any suitable source. In one instance, the light source emits a broad spectrum white light through a polarizer and into the photo-elastic sleeve. If the polarized light is not directed through the photo-elastic sleeve along the axis of the rotating shaft, at 704 the light can be re-directed along the axis of the rotating shaft. For example, the light source can be configured to deliver light into the photo-elastic sleeve perpendicularly to the rotating shaft. A reflective notch can be cut into the photo-elastic sleeve in order to redirect the light along the axis of the rotating shaft.

At 706 the light exiting the photo-elastic sleeve is captured by a capturing component, such as for example a digital camera, or optical detector chip. In one example, a collar of the photo-elastic sleeve is coated with a reflective substance, thereby requiring the light to pass through the photo-elastic sleeve along the axis of the rotating shaft twice. The light will then exit the photo-elastic sleeve in substantially the same position as it entered the photo-elastic sleeve. Requiring the light to pass through the photo-elastic sleeve twice increases the number of fringes in the resulting fringe pattern, which thereby increases the sensitivity of the optical torque sensor. Since the light travels across a longitudinal portion of the collar that is commensurate with a longitudinal portion of the shaft, significantly more data is gathered regarding the shaft than is made available via prior art systems. In another embodiment, a collar of the photo-elastic sleeve is not coated with a reflective substance, thus allowing the light to exit the photo-elastic sleeve at the uncoated edge. In this instance, a capturing component is placed at the uncoated edge of the photo-elastic sleeve in order to capture the exiting light. The capturing component can be any device capable of capturing the fringe pattern image. The captured fringe pattern can be a color image or a grayscale image.

At 708 the captured image is relayed to a computing system. The captured image can be relayed via bus, transmission line, wireless transmitter, etc. If the capturing component is a digital component (e.g., a digital camera), the capturing component can send digital data directly to the computing system. Otherwise the computing system can be configured to convert the image of the fringe pattern to digital data. Furthermore, the computing component can be configured to convert a color image to a grayscale image and vice versa. Moreover, analog data can be analyzed as well.

At 710 the computing system determines torsion strained in the photo-elastic sleeve, and thereby determines and/or infers information relating to strain in the rotating shaft. The computing component can determine the torsion strain on the rotating shaft by utilizing an function of difference in principal strains. When viewed through polarizing filters, the light returning exiting the photo-elastic material exhibits a fringe pattern which is a function of material strain, wavelength of light, material thickness, and material strain-optic coefficient. A capturing device utilizing polarizing filters, such as for example a digital camera or an optical sensing chip can be employed to capture the beam of light (the fringe pattern) exiting the photo-elastic material. The strain of the photo-elastic material, and thus the strain on the rotating shaft can then be determined using an optical inspection device. Alternatively, a computing component in response to output from the capturing device can determine the torsion strain on the rotating shaft.

The subject invention can be implemented with any rotating shaft that may incur strain from driving a load. For example, the invention could be employed to determine the torque and strain on a turbine drive shaft, a drive shaft on a truck or automobile, a shaft driving a helicopter blade, etc. The invention can also be coupled to a control system, thereby protecting the shaft from failure due to excessive torque. A control system can also be employed in connection with the present invention to control operation of the shaft by utilizing one or more parameters that can be sensed by the sensor (e.g., rotational speed, acceleration, displacement, vibration, temperature, torque, stress . . . ). For example, this provides an effective method for constant torque control. Furthermore, the invention can be used in connection with a diagnostic system, wherein upon reaching a critical point of strain the diagnostic system will inform an operator that repair or replacement of the shaft is necessary. In another embodiment, a prognostic system utilizing inferential techniques can be employed to predict a time in the future when repair or replacement of the shaft will be necessary. Lastly, high frequency analysis of the torque signal using established frequency domain or joint time-frequency methods can be a very effective, low cost, diagnostic tools. Also, the broad inspection sensing area can provide a capability to inspect composite joint(s) dynamics.

To the accomplishment of the foregoing and related ends, the invention then comprises the features hereinafter fully described and particularly pointed out in the claims. The following description and the annexed drawings set forth in detail certain illustrative aspects of the invention. These aspects are indicative, however, however, of but a few of the various ways in which the principles of the invention may be employed an the present invention is intended to include all such aspects and their equivalents. Other objects, advantages and novel features of artificial intelligence component. After computing the torsion strain of the rotating shaft the computing system can relay the computed strain to a display component and/or a storage component for displaying and/or storing the computed torsion strain. The computing component can also relay the torsion strain data to a control component that utilizes the real-time torsion strain data to control operation of the rotating shaft. The computing component can also send information to a diagnostic unit to determine health of machine or predict a future machinery failure (e.g., due to metal fatigue). The data image can be relayed from the computing component to the display component and/or storage component via bus, transmission line, wireless transmitter, etc.

Figure 8:
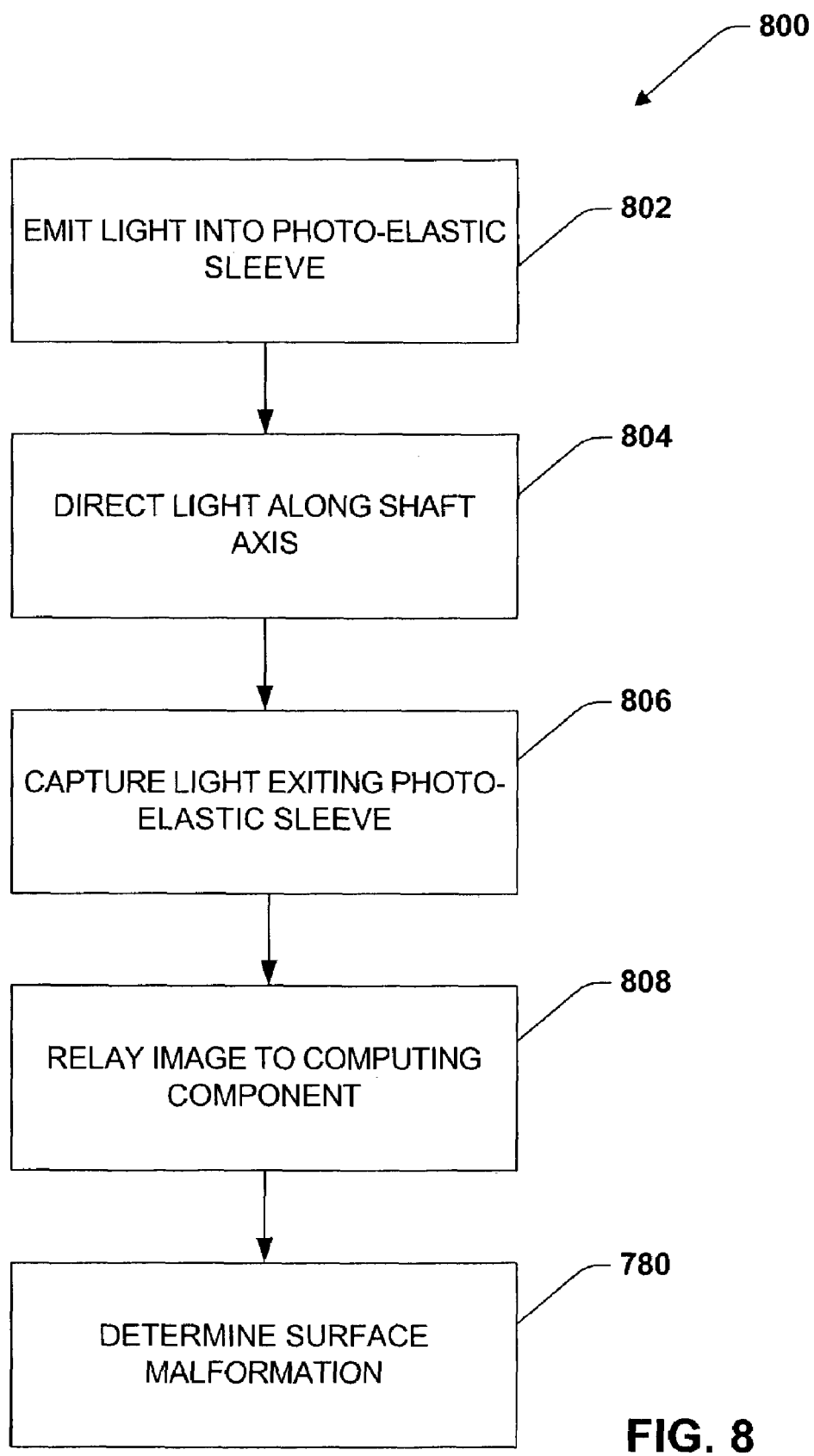
FIG. 8 is a flow diagram of a method that facilitates monitoring the surface of a rotating shaft in accordance with an aspect of the present invention.

Turning now to FIG. 8, a methodology for monitoring the surface of a rotating shaft 800 in conjunction with an optical torque sensor in accordance with one aspect of the present invention is displayed. At 802, linearly polarized light is delivered to a photo-elastic sleeve which encircles at least a portion of a rotating shaft. If the light delivered by the light source is not directed along the axis of the rotating shaft, at 804 the light is re-directed along the axis of the rotating shaft. The light will manifest properties corresponding to deformations in the photo-elastic sleeve caused by defects and/or strain in the rotating shaft as the light travels along the axis of the rotating shaft. When the light encounters a deformation in the photo-elastic sleeve properties of photo-elastic material, such as the index of refraction, will be altered.

At 806, the light exiting the photo-elastic sleeve is captured by a capturing component, such as a digital camera. The collar of the photo-elastic sleeve can be coated with a reflective substance, thereby requiring the light to pass through the photo-elastic sleeve twice prior to exiting the photo-elastic sleeve and reaching the capturing device. Alternatively, the light traveling through the photo-elastic sleeve can be captured by a capturing component after traveling through the photo-elastic sleeve a single time. In one embodiment, each image captured by the capturing component can be stored in a local memory until the rotating shaft has completed one full rotation. The capturing component can then mesh the images together (e.g., via image reconstruction, signal/image processing) in order to created a full surface image of the rotating shaft. In another embodiment, the capturing component relays the images in real-time to a computing component. The capturing component can capture the images produced by the light exiting the photo-elastic sleeve in either grayscale or color.

At 808, the images are relayed to a computing component. The images relayed by the capturing component can be in color or grayscale, and the computing component can convert a color image to a grayscale image and vice versa. If required, the computing component may also convert an analog image relayed from the capturing component into digital data. If the images of one full rotation of the shaft that are relayed to the computing component are not previously meshed by the capturing component, the computing component can mesh the images to create a full surface image of the rotating shaft. At 810 the computing component determines any malformations in the rotating shaft (e.g., analyze the shaft dynamically to detect joint failure). In one embodiment, the computing component utilizes a neural network to determine the degree of malformation in the rotating shaft such as for example joint/coupling failure or failure of composition material.

Figure 9A:
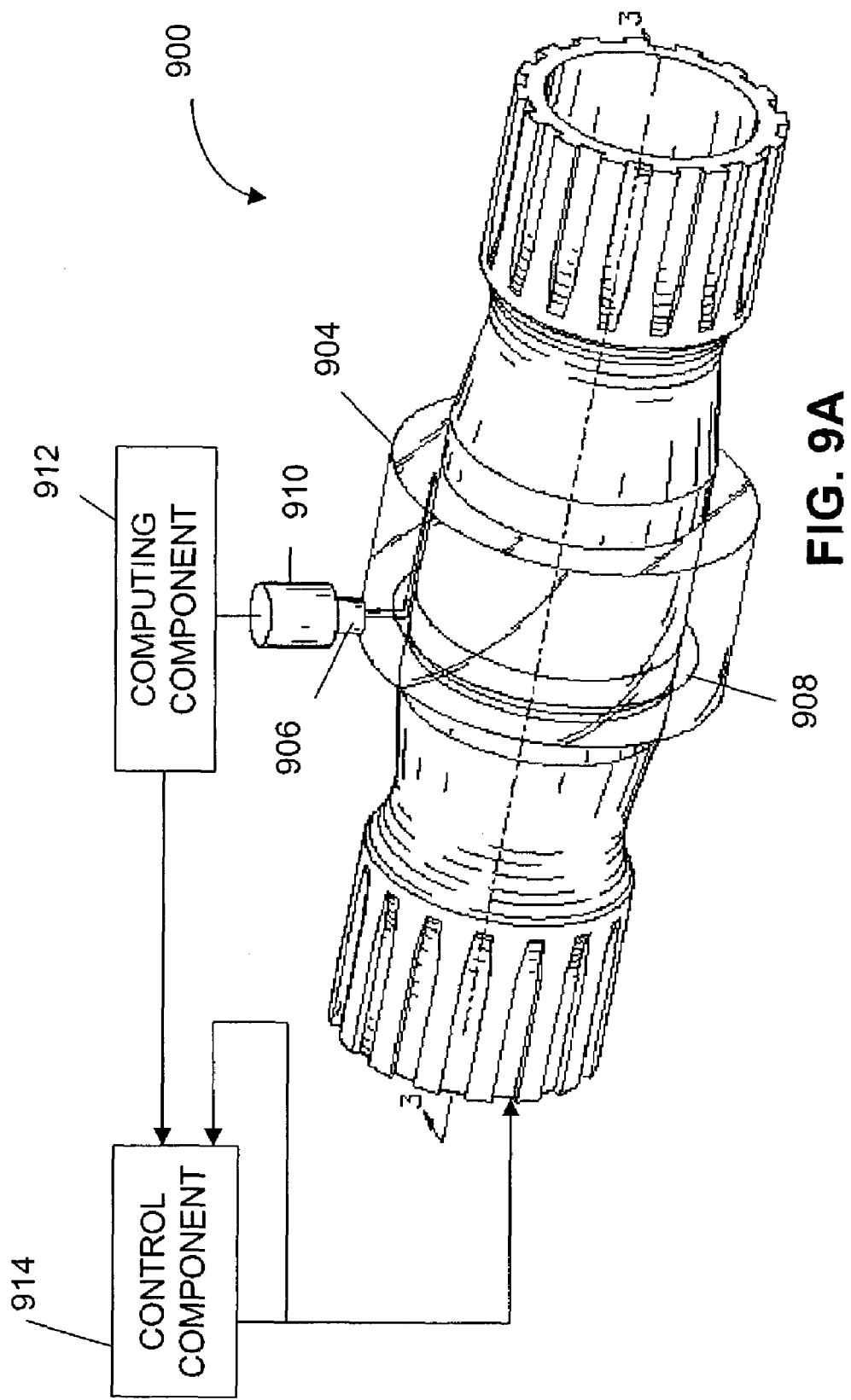

Referring now to FIG. 9A, an optical torque sensing system 900 used in conjunction with a closed-loop control component 914 in accordance with one aspect of the present invention is illustrated. The control component 914 of the optical torque sensing system 900 can include a drive mechanism for driving the rotating shaft such as for example via controlling current of an electric motor. A beam of light is delivered from a light emitting component 906 into a photo-elastic sleeve 904 which encircles a rotating shaft 902. The beam of light is re-directed through the photo-elastic sleeve 904 along the axis of the rotating shaft 902 by a reflective notch 908 cut at an appropriate angle to the light delivered by the light emitting component 906. The light travels along the axis of the rotating shaft 902 until reaching the end of the collar of the photo-elastic sleeve 904. The end of the collar of the photo-elastic sleeve can be coated with a reflective substance (e.g., aluminum filled epoxy), thereby reflecting the light back through the photo-elastic sleeve 904 towards a capturing component 910. The capturing component 910 captures an image of the fringe pattern produced by the light exiting the photo-elastic sleeve 904. The capturing component relays image to a computing component 912, which utilizes an artificial neural network to analyze the data resulting from the image in order to determine the torsion strain of the rotating shaft 902. The computing component can also determine rotational speed, displacement, acceleration, vibration, temperature, and longitudinal strain. The computing component 912 can employ artificial intelligence to determine which parameters regarding the rotating shaft to compute and/or relay. Additionally, the computing component can utilize image processing techniques and count fringes to apply Equation 4, and determine difference in strain.

The computing component 912 can then relay data regarding at least one of the aforementioned measured parameters regarding the rotating shaft 902 to a control component 914. The control component 914 can utilize the at least one parameter to control the operation of the rotating shaft 902. By utilizing a control component 914 in connection with the optical torque sensing system 900, the operational life of a rotating shaft 902 can be extended. Accurate torque control can also enhance critical manufacturing processes requiring precise torque control such as for tissue or film manufacturing. A closed-loop control system allows for more robust and stable control of the operation of the rotating shaft 902; however, an open-loop control system could also be employed to control the operation of the rotating shaft 902.

Figure 9B:
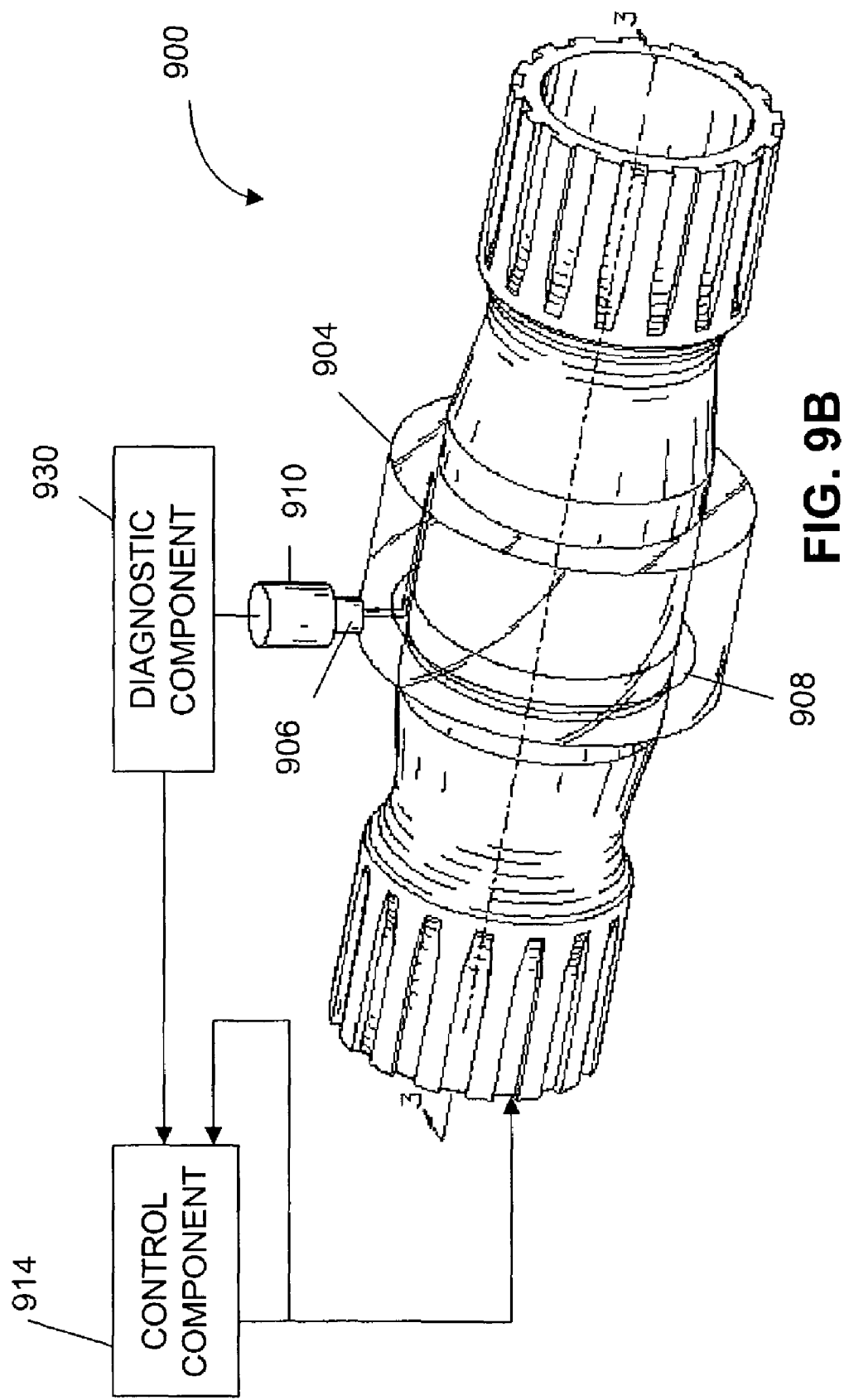

FIG. 9B illustrates another embodiment wherein a diagnostic component 930 is employed. Likewise, FIG. 9C illustrates an embodiment wherein a diagnostic component is integrated with a control component 914'.

Figure 10:
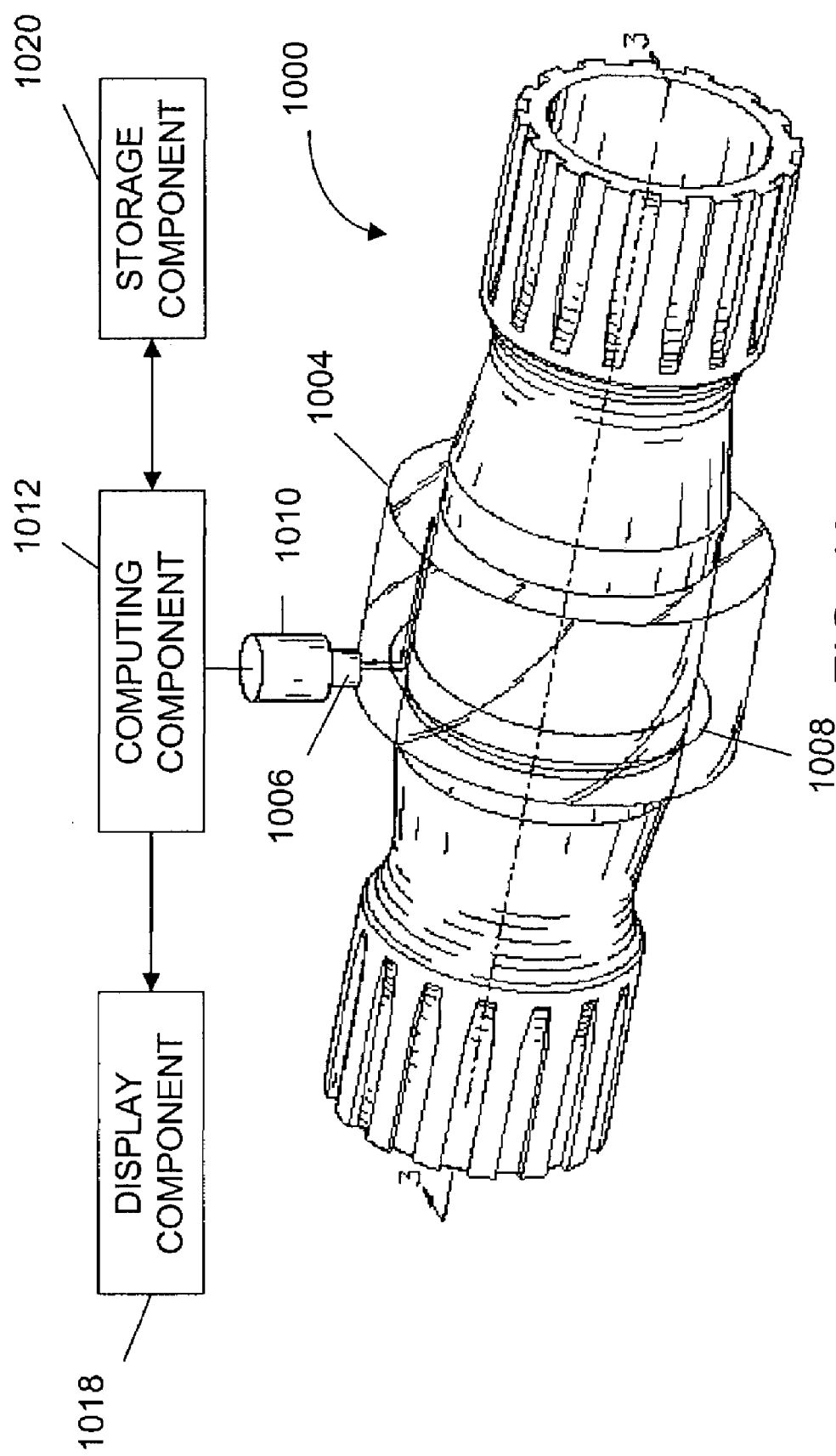
FIG. 10 illustrates an exemplary optical torque sensor used in conjunction with a storage component and/or a display component in accordance with an aspect of the present invention.

Turning to FIG. 10, an optical torque sensor 1000 operating in conjunction with a display component 1018 and a storage component 1020 in accordance with one aspect of the invention is displayed. The optical torque system 1000 operates in substantially the same manner as the optical torque system of FIG. 9. The computing component 1012 is employed to relay the determined data regarding the rotating shaft 1002 (e.g., torsional strain, longitudinal strain, rotational speed . . . ) to a display component 1018 and/or a storage component 1020 for displaying and/or storing at least one of the parameters sensed by the optical torque sensor 1000.

This display component 1018 can be an electrical device, such as a computer monitor. The data delivered to the display component can then be delivered to an operator numerically, graphically, or by any other means which would allow an operator to determine the value of the data. Alternatively, the display component can be a mechanical device such as a needle employed to direct an operator's eyes to the corresponding measuring unit (much like a car speedometer), or an LED or series of LEDs (e.g., OK, caution, fault . . . ). The storage component can be any device capable of storing data. For example, a tape, ROM, RAM, computer disk, CD, DVD, and a hard drive are all examples of devices that can be employed as a storage component 1020 in conjunction with the optical torque sensing system 1000 of the present invention.

Figure 11:
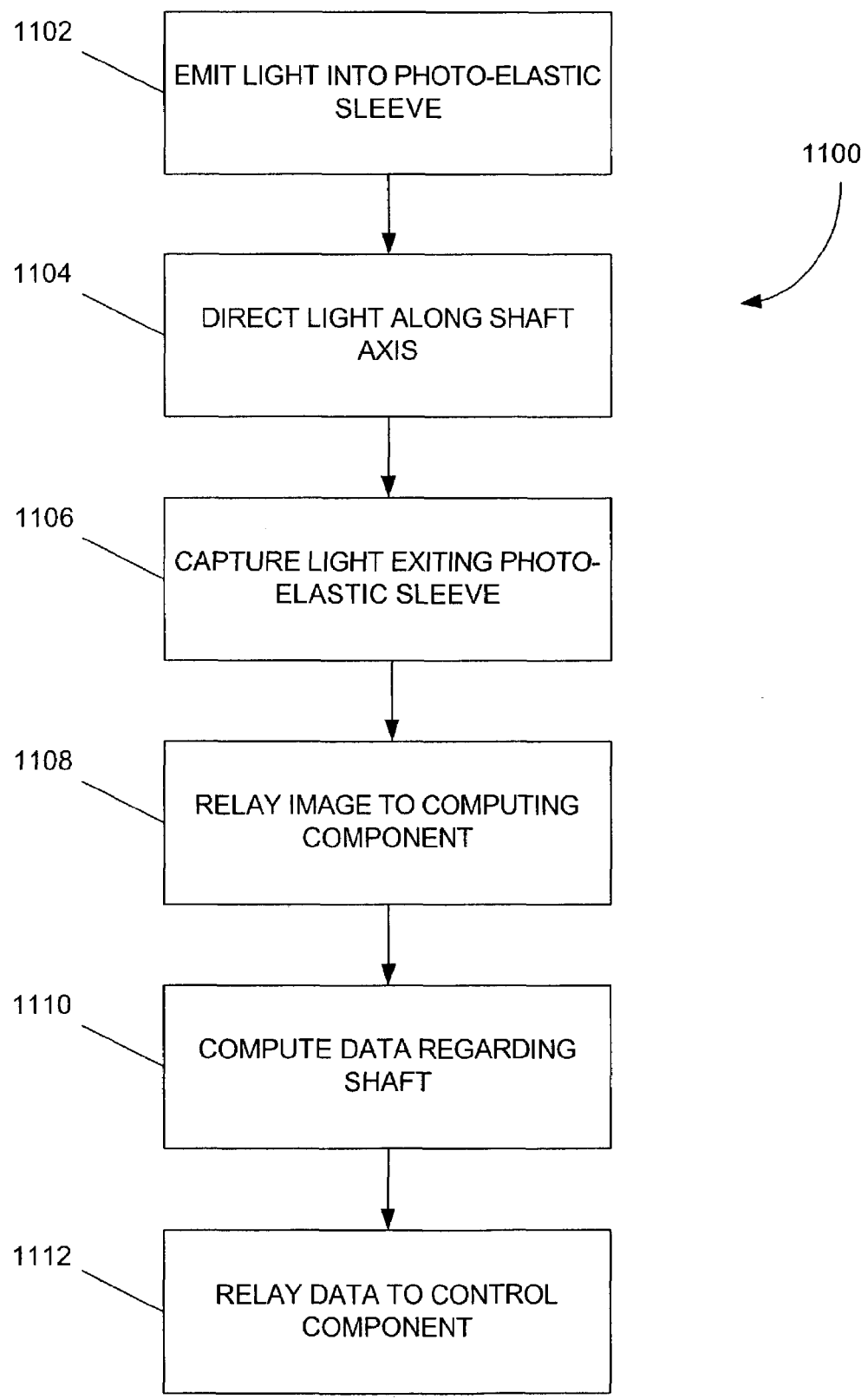
FIG. 11 is a flow diagram of a method that facilitates the control of a rotating shaft utilizing input from an optical torque sensor in accordance with an aspect of the present invention.

Referring to FIG. 11, a method for utilizing an optical torque sensor in conjunction with a control component 1100 in accordance with one aspect of the present invention is displayed. At 1102 linearly polarized light is delivered into a photo-elastic sleeve that encircles a rotating shaft. If the light delivered by the light source is not directed along the axis of the rotating shaft, at 1104 the light is re-directed along the axis of the rotating shaft.

At 1106, the light exiting the photo-elastic sleeve is captured by a capturing component, such as a digital camera. The collar of the photo-elastic sleeve can be coated with a reflective substance, thereby requiring the light to pass through the photo-elastic sleeve twice prior to exiting the photo-elastic sleeve and reaching the capturing device. Alternatively, the light traveling through the photo-elastic sleeve can be captured by a capturing component after traveling through the photo-elastic sleeve a single time.

At 1108, the images are relayed to a computing component. The images can be relayed through a bus, through transmission lines, via wireless transmitter, etc. The images relayed by the capturing component can be in color or grayscale, and the computing component can convert a color image to a grayscale image and vice versa. If required, the computing component can also convert an analog image relayed from the capturing component into digital data. If the data derived from the images will be used in conjunction with a control component, the images captured by the capturing component can be transferred to the computing component in real-time, thereby allowing for more robust control of the rotating shaft. The capturing component can also capture the images in digital format to facilitate faster processing of the data contained in the image.

At 1110 the computing component can utilize an AI component to analyze the data contained in the images to derive desired parameters regarding the rotating shaft. For example, the computing component can compute torsion strain, longitudinal strain, shaft speed, shaft acceleration, jerk, displacement, vibration, temperature, and dynamic stress of the shaft. An artificial neural network can be employed to manipulate the data contained in the images in order to determine any of the mentioned parameters regarding the rotating shaft. Artificial intelligence techniques can be employed by the computing component to determine which parameters regarding the rotating shaft to compute and/or relay.

At 1112, the computing component relays the data and analysis results to a control component. The data can be relayed through a bus, through transmission lines, via wireless transmitter, etc. The computing component can relay the data to the control component in real time, thus allowing for robust control of the rotating shaft. The control component can utilize an open or closed-loop control system to control the operation of the rotating shaft, thereby increasing the efficiency and operational-life of the rotating shaft. The control component generally controls the operation of a drive mechanism that drives the shaft; thus the rotation of the shaft is controlled. The computing component can also relay data to other components at the same time (e.g., a display component and/or storage component).

Figure 12:
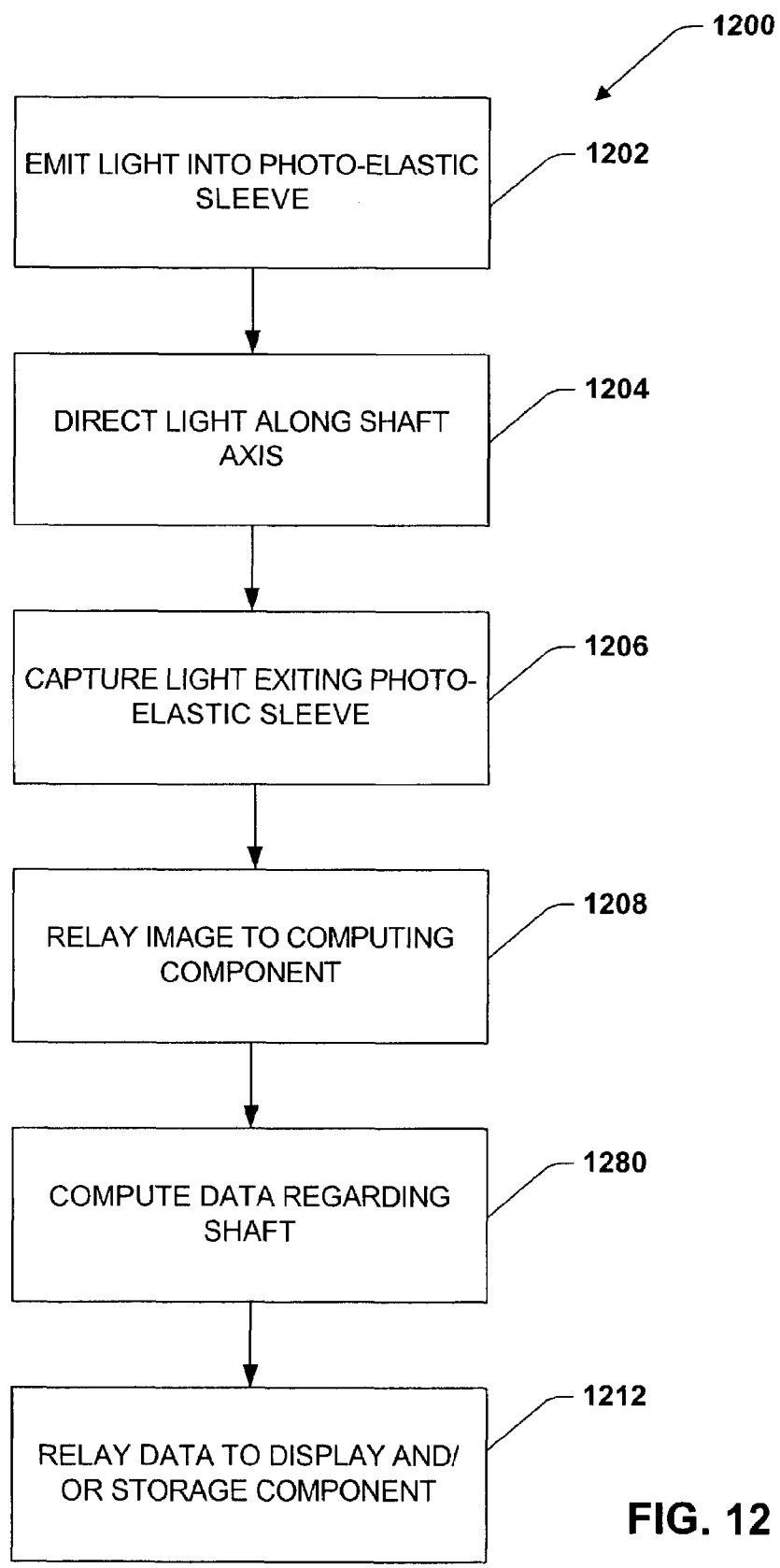
FIG. 12 is a flow diagram of a method that facilitates the display and/or storage of parameters sensed by an optical torque sensor in accordance with an aspect of the present invention.

Referring now to FIG. 12, a methodology for displaying and/or storing data sensed by an optical torque sensor 1200 in accordance with one aspect of the present invention is illustrated. At 1202 linearly polarized light is delivered into a photo-elastic sleeve that encircles a rotating shaft. At 1204 the light is directed along the axis of the rotating shaft if the light source is not configured to deliver light along the axis of the rotating shaft.

At 1206 the light exiting the photo-elastic sleeve is captured by a capturing component. Then at 1208 the images captured by the capturing component are relayed to a computing component. At 1210 the computing component can utilize a neural network to manipulate the data contained in the images to derive desired parameters regarding the rotating shaft. Artificial intelligence techniques can be employed by the computing component to determine which parameters regarding the rotating shaft to compute and/or relay. At 1212 the resulting data is relayed to a storage component and/or a display component. The data can be relayed through a bus, through transmission lines, via wireless transmitter, etc. The storage component can be any device that can be used to store data (e.g., tape, disk, CD, DVD, ROM, RAM, hard drive . . . ). The display component can be electrical or mechanical, and can be configured to display the data numerically, graphically, etc.

Figure 13:
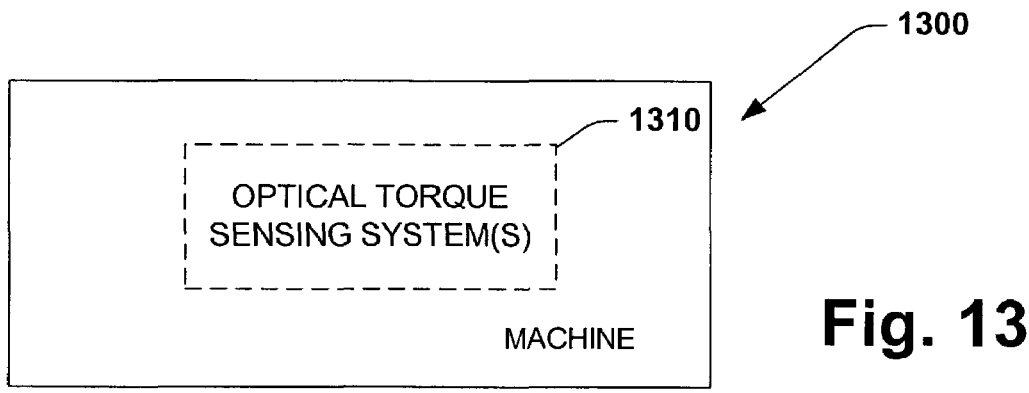
FIG. 13 is a high-level system diagram of a machine employing the subject invention.

FIG. 13 illustrates a high-level system diagram of a machine 1300 employ optical torque sensing system(s) 1310 in accordance with the subject invention. The machine can employ one or more optical torque sensing systems. For example, a single shaft can have the sensing systems deployed at various locations of the shaft. Also, if the machine 1300 employs more than one shaft, multiple torque sensing system can be employed in connection therewith. It is to be appreciated that multiple torque sensing systems in accordance with the subject invention can communicate with each other or at least a subset thereof in connection with optimizing performance of the machine (e.g., load balancing, output . . . ). For example, for a machine employing a first and second shaft, the optical torque sensing systems for the respective shafts can facilitate regulating usage of the various shafts so as to optimize performance of the machine and/or extend life of the machine as well as shafts. Thus, if the first shaft is exhibiting signs of fatigue/potential failure, the second shaft can be tasked with taking on more load than the first shaft in order to extend life of the first shaft until a convenient time for service.

It is to be appreciated that the machine can be of any suitable type (e.g., motor, pump, drive, automobile, boat, ship, helicopter, airplane, motorcycle, equipment, truck, tank, submarine, fan . . . ) that employs a rotating shaft.

Figure 14:
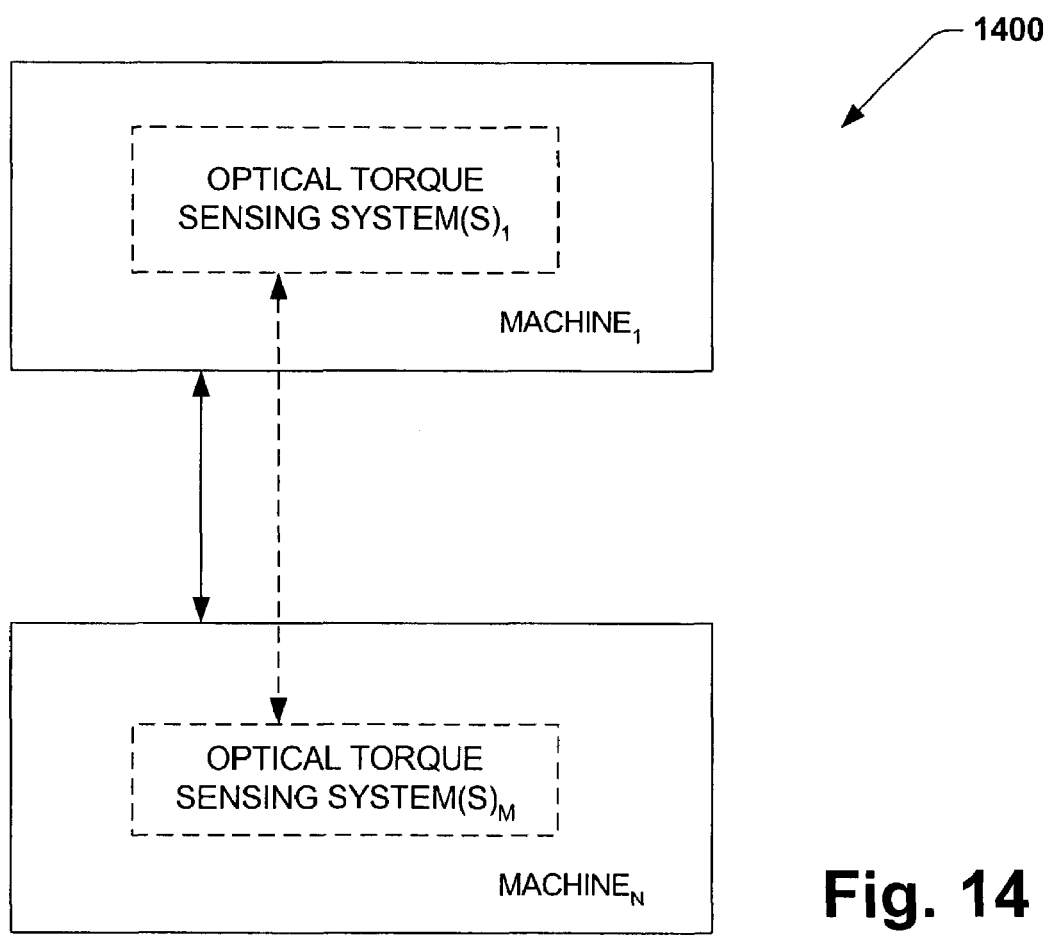
FIG. 14 is a high-level system diagram of a group of machines employing the subject invention.

FIG. 14 illustrates a plurality of "N" machine (N being an integer) that respective employ M optical torque sensing systems (M also being an integer) in accordance with the subject invention. The machines can be part of a distributed system such that coordination thereof is desired in order to optimize the system. By operatively coupling the machines and the respective sensing systems, performance of the machines with respect to the overall system can be optimized.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An optical torque sensing system comprising:
   a sleeve of photo-elastic material that overlays a portion of a shaft;
   a light emitting component that delivers light to the sleeve at an angle to the axis of the shaft;
   a notch that is coated with a reflective substance, wherein the edges of the notch are at an angle to the light delivered by the light emitting component such that light is redirected by the notch along a longitudinal axis of the shaft through the photo-elastic material;
   a capturing component that captures light exiting the photo-elastic material, the exiting light manifesting characteristics relating to the shaft; and
   a computing system that receives data from the capturing component relating to the shaft.

2. The system of claim 1, the received data comprising fringe pattern information corresponding to strain of the shaft.

3. The system of claim 2, the strain being torsional strain.

4. The system of claim 1, the computing system further comprising an artificial intelligence (AI) system.

5. The system of claim 4, the AI system comprising at least one of: a neural network, an expert system, a support vector machine (SVM), a Bayesian belief network, a data fusion system.

6. The system of claim 1 further comprising an implicitly trained classifier.

7. The system of claim 1, the computing system is configured to compute at least one of the following shaft parameters from fringe pattern images: rotational speed, rotational acceleration, shaft displacement, shaft vibration, shaft temperature, and longitudinal strain.

8. The system of claim 7, wherein the computing system uses a classifier to determine which parameters of the shaft to compute.

9. The system of claim 1, the computing system utilizing fringe pattern images to monitor a surface of the shaft.

10. The system of claim 1, further comprising a control component that controls operation of rotating shaft, the control being based at least in part upon information relayed from the computing system.

11. The system of claim 10, the control component comprises an open-loop control system.

12. The system of claim 10, the control component comprises a closed-loop control system.

13. The system of claim 1, further comprising a display component that displays data provided by the computing system.

14. The system of claim 13, wherein the display component displays the data graphically.

15. The system of claim 13, wherein the display component displays the data numerically.

16. The system of claim 1, wherein at least one collar of the photo-elastic material is coated with a reflective substance.

17. The system of claim 16, the light passing along a longitudinal axis of the shaft twice, initially transmitted and then reflected.

18. The system of claim 1, the capturing component is a digital camera.

19. The system of claim 1, the capturing component relays a grayscale image to the computing system.

20. The system of claim 1, the capturing component relays a color image to the computing component.

21. The system of claim 20, wherein the computing system converts the color image to a grayscale image.

22. The system of claim 1, the capturing component relays digital data to the computing system.

23. The system of claim 1, the capturing component relays analog data to the computing system.

24. The system of claim 23, wherein the computing system converts the analog data to digital data.

25. The system of claim 1, the computing system is employed to utilize diagnostic techniques to inform an operator that replacement/repair of the rotating shaft is necessary.

26. The system of claim 1, the computing system prognoses future state of the shaft.

27. An optical torque sensing system, comprising:
   an emission component that transmits light; and
   a photo-elastic collar with a notch coated with a reflective substance that circumferentially conforms to a portion of a shaft, wherein the edges of the notch are at an angle to the light delivered by the emission component such that the photo-elastic collar receives light from the emission component at an angle to an axis of the shaft and redirects the light via the notch along a longitudinal axial direction of the shaft.

28. The system of claim 27, the photo-elastic collar comprising at least one of; a polycarbonate-based compound, a polyester-based compound, a polysulfone-based compound, a polyether sulfone-based compound, a polystyrene-based compound, a polyolefin-based compound, a polyvinyl alcohol-based compound, a cellulose acetate-based compound, a polyvinyl chloride-based compound, a polymethyl methacrylate-based compound, a polyacrylate-based compound, a polyamide-based compound and/or a combination thereof.

29. The system of claim 27, the photo-elastic collar deforming as a function of stress of the shaft.

30. The system of claim 27, the collar comprising a beam-splitter.

31. The system of claim 27, the photo-elastic material comprising gratings.

32. The system of claim 27, the photo-elastic material comprising dopants.

33. The system of claim 27, the photo-elastic material comprising photosensitive materials.

34. The system of claim 27, the collar comprising a reflective coating.

35. The system of claim 27, the light traveling in two orthogonal directions within the collar.

36. The system of claim 27, the light traveling in two parallel paths within the collar.

37. A method that facilitates the determination of torsion strain in a rotating shaft comprising: delivering light to a photo-elastic material at an angle orthogonal to an axis of the shaft, the photo-elastic material encircling at least a portion of a rotating shaft; receiving light at one end of the photo-elastic material; redirecting the light from the end of the material along a longitudinal axis of the shaft via a notch coated with a reflective substance, the edges of the notch are at an angle to the light received; capturing a fringe pattern created by the light as the light exits the photo-elastic material; relaying the captured fringe pattern to a computing system; and determining the torsion strain in the rotating shaft by analyzing the fringe pattern.

38. The method of claim 37, further comprising employing a classifier to facilitate determining the torsion strain in the rotating shaft.

39. The method of claim 37, further comprising employing a digital camera to capture the fringe pattern.

40. The method of claim 37, further comprising relaying the torsion strain computed by the computing system to a control component, wherein the control component controls operation of the rotating shaft.

41. The method of claim 37, further comprising relaying the torsion strain computed by the computing system to a storage component, wherein the storage component stores the torsion strain computed by the computing component.

42. The method of claim 37, further comprising relaying the torsion strain computed by the computing system to a display component, wherein the display component displays the torsion strain computed by the computing component.

43. A system that facilitates monitoring a rotating shaft comprising:

means for receiving light from an external source emitted at an angle to an axis of the shaft;

means for redirecting light along an axis of the shaft from one end of the shaft via a notch coated with a reflective substance, the edges of the notch are at an angle to the light received;

means for capturing a fringe pattern created by the light after passing along the shaft axis; and means for analyzing the fringe pattern.

44. An optical torque sensing system comprising: a photo-elastic material that overlays a portion of a shaft; a light-emitting component that delivers light at an angle orthogonal to an axis of the shaft to the photo-elastic material, the light is received at one end of the photo-elastic material and redirected through the photo-elastic material along at least two orthogonal directions within the medium via a notch coated with a reflective substance, the edges of the notch are at an angle to the light delivered; and a computing system that analyzes data corresponding to light exiting the material, the exiting light manifesting information regarding state of the shaft.

45. The system of claim 44, the material being in the shape of a sleeve.

46. The system of claim 44, the material being in the shape of a collar.

47. A motor employing the system of claim 44.

48. A pump employing the system of claim 44.

49. An aircraft employing the system of claim 44.

50. A helicopter employing the system of claim 44.

51. The system of claim 44 further comprising an interferometer.

52. The system of claim 44 further comprising a classifier.

53. The system of claim 52, the classifier performing a utility-based analysis to generate a prognosis as to future state of the shaft.

54. The system of claim 52, the classifier performing a utility-based analysis to generate a diagnose present state of the shaft.

* * * * *